(12) United States Patent
Kato

(10) Patent No.: US 12,108,179 B2
(45) Date of Patent: Oct. 1, 2024

(54) PHOTOELECTRIC CONVERSION DEVICE AND IMAGING SYSTEM

(71) Applicant: CANON KABUSHIKI KAISHA, Tokyo (JP)

(72) Inventor: Yasuhiro Kato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 141 days.

(21) Appl. No.: 18/062,270

(22) Filed: Dec. 6, 2022

(65) Prior Publication Data

US 2023/0199347 A1 Jun. 22, 2023

(30) Foreign Application Priority Data

Dec. 17, 2021 (JP) ................................ 2021-204906

(51) Int. Cl.
*H04N 25/77* (2023.01)
*H04N 25/779* (2023.01)
*H04N 25/78* (2023.01)

(52) U.S. Cl.
CPC ........... *H04N 25/77* (2023.01); *H04N 25/779* (2023.01); *H04N 25/78* (2023.01)

(58) Field of Classification Search
CPC ...... H04N 25/77; H04N 25/779; H04N 25/78; H04N 25/707
See application file for complete search history.

(56) References Cited

U.S. PATENT DOCUMENTS

| 9,930,275 | B2 * | 3/2018 | Shimamura | ............ H04N 25/75 |
| 10,574,928 | B2 * | 2/2020 | Nikai | ...................... H04N 25/75 |
| 11,039,057 | B2 * | 6/2021 | Ochiai | ................... H04N 25/78 |
| 2017/0195603 | A1 | 7/2017 | Kawazu et al. | |
| 2019/0222788 | A1 | 7/2019 | Nikai et al. | |

FOREIGN PATENT DOCUMENTS

| JP | 2009-272820 A | 11/2009 |
| JP | 2012-23663 A | 2/2012 |
| JP | 2019-153822 A | 9/2019 |
| WO | 2015/133323 A1 | 9/2015 |

\* cited by examiner

*Primary Examiner* — Ahmed A Berhan
(74) *Attorney, Agent, or Firm* — VENABLE LLP

(57) ABSTRACT

The photoelectric conversion device includes a plurality of pixels, a plurality of signal lines, a pixel control unit that controls readout of signals from the pixels, a column circuit unit that generates pixel data from the signals read out from the pixels, and a signal processing unit configured to perform digital signal processing on the pixel data. The signal lines include first and second signal lines on the same column, and a period of reading out a signal from the first signal line and a period of reading out a signal from the second signal line overlap each other, and the signal processing unit includes a difference acquisition unit that acquires a difference value between a pixel data read out to the first signal line and a pixel data read out to the second signal line, and a correction unit that corrects the pixel data based on the difference value.

18 Claims, 17 Drawing Sheets

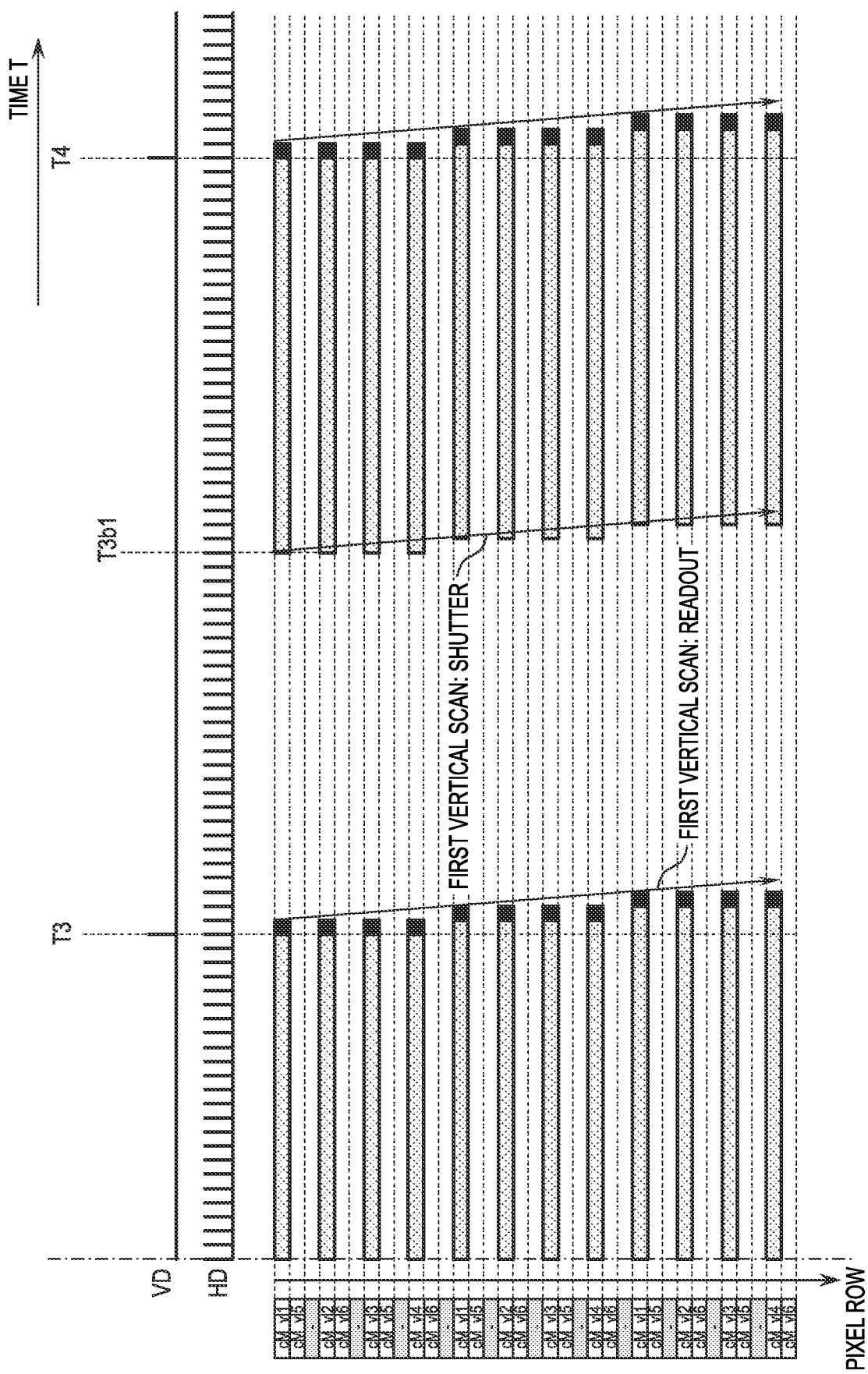

FIG. 10

| CORRECTION VALUE[LSB] | DIFFERENCE VALUE[LSB] ||
|---|---|---|
| | MINIMUM VALUE | MAXIMUM VALUE |
| 1 | min1 | max1 |
| 2 | min2 | max2 |
| ⋮ | ⋮ | ⋮ |
| n | minn | maxn |

PHOTOELECTRIC CONVERSION DEVICE AND IMAGING SYSTEM

BACKGROUND OF THE INVENTION

Field of the Invention

The present invention relates to a photoelectric conversion device and an imaging system.

Description of the Related Art

In a CMOS image sensor which is an X-Y address type imaging device, there is known an imaging device in which a plurality of vertical signal lines are arranged in the same pixel column, and pixel data is read out from a plurality of pixels in the same pixel column at the same time via the plurality of vertical signal lines. By performing two or more different vertical scans at the same time in an imaging device having a plurality of vertical signal lines in the same pixel column, images of different purposes can be captured in parallel. Japanese Patent Application Laid-Open No. 2012-023663 discloses a technology for reading out a pixel signal for a live view image using a vertical signal line different from a vertical signal line for reading out a pixel signal for a still image during still image photographing.

However, when a plurality of pixel data is read out from a plurality of signal lines of the same pixel column at the same time as described in Japanese Patent Application Laid-Open No. 2012-023663, the image quality may be degraded.

SUMMARY OF THE INVENTION

It is an object of the present invention to provide a photoelectric conversion device and an imaging system capable of suppressing degradation of image quality when a plurality of pixel data is read out from a plurality of signal lines of the same pixel column.

According to an embodiment of the present disclosure, there is provided a photoelectric conversion device including a pixel unit including a plurality of pixels each including a photoelectric conversion unit, the plurality of pixels being arranged to form a plurality of rows and a plurality of columns, a plurality of signal lines arranged at least two on each of the plurality of columns and each connected to a pixel of a corresponding column, a pixel control unit configured to control a readout of signals from the plurality of pixels to the plurality of signal lines in row basis, a column circuit unit configured to generate a pixel data that is a digital signal obtained by performing an AD conversion on an analog signal read out from the pixel unit to each of the plurality of signal lines; and a signal processing unit configured to perform a digital signal processing on the pixel data output from the column circuit unit, wherein the plurality of signal lines includes a first signal line and a second signal line arranged on the same column, and a period during which a readout from a pixel of one row to the first signal line is performed and a period during which a readout from a pixel of the other row to the second signal line is performed overlap each other, and wherein the signal processing unit includes a difference acquisition unit configured to acquire a difference value between a pixel data based on a signal read out to the first signal line and a pixel data based on a signal read out to the second signal line, and a correction unit configured to perform a correction processing of the pixel data based on the difference value.

According to another embodiment of the present specification, there is provided a signal processing device configured to perform a signal processing on a signal output from a photoelectric conversion device including a pixel unit including a plurality of pixels each including a photoelectric conversion unit, the plurality of pixels being arranged to form a plurality of rows and a plurality of columns, a plurality of signal lines arranged at least two on each of the plurality of columns and each connected to a pixel of a corresponding column, a pixel control unit configured to control a readout of signals from the plurality of pixels to the plurality of signal lines in row basis, and a column circuit unit configured to generate a pixel data that is a digital signal obtained by performing an AD conversion on an analog signal read out from the pixel unit to each of the plurality of signal lines, wherein the plurality of signal lines includes a first signal line and a second signal line arranged on the same column, and a period during which a readout from a pixel of one row to the first signal line is performed and a period during which a readout from a pixel of the other row to the second signal line is performed overlap each other, the signal processing device including a difference acquisition unit configured to acquire a difference value between a pixel data based on a signal read out to the first signal line and a pixel data based on a signal read out to the second signal line, and a correction unit configured to perform a correction processing of the pixel data based on the difference value.

Further features of the present invention will become apparent from the following description of exemplary embodiments with reference to the attached drawings.

BRIEF DESCRIPTION OF THE DRAWINGS

FIG. 6A and FIG. 6B are timing charts illustrating an operation example of the photoelectric conversion device according to the first embodiment of the present invention.

FIG. 9 and FIG. 10 are diagrams illustrating a method of correcting pixel data in the photoelectric conversion device according to the first embodiment of the present invention.

DESCRIPTION OF THE EMBODIMENTS

Preferred embodiments of the present invention will now be described in detail in accordance with the accompanying drawings.

First Embodiment

Figure 1:
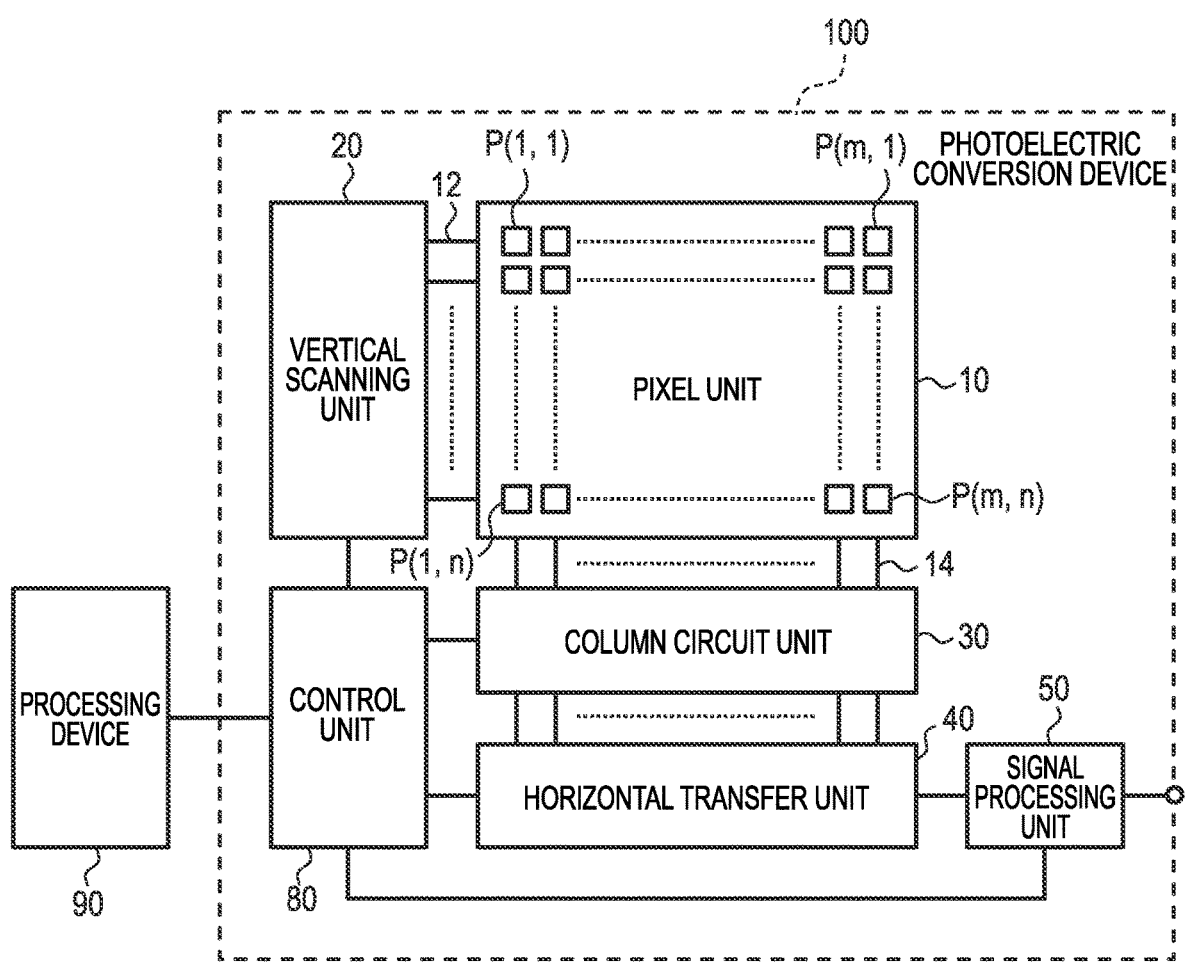
FIG. 1 is a block diagram illustrating a configuration example of a photoelectric conversion device according to a first embodiment of the present invention.
Figure 2:
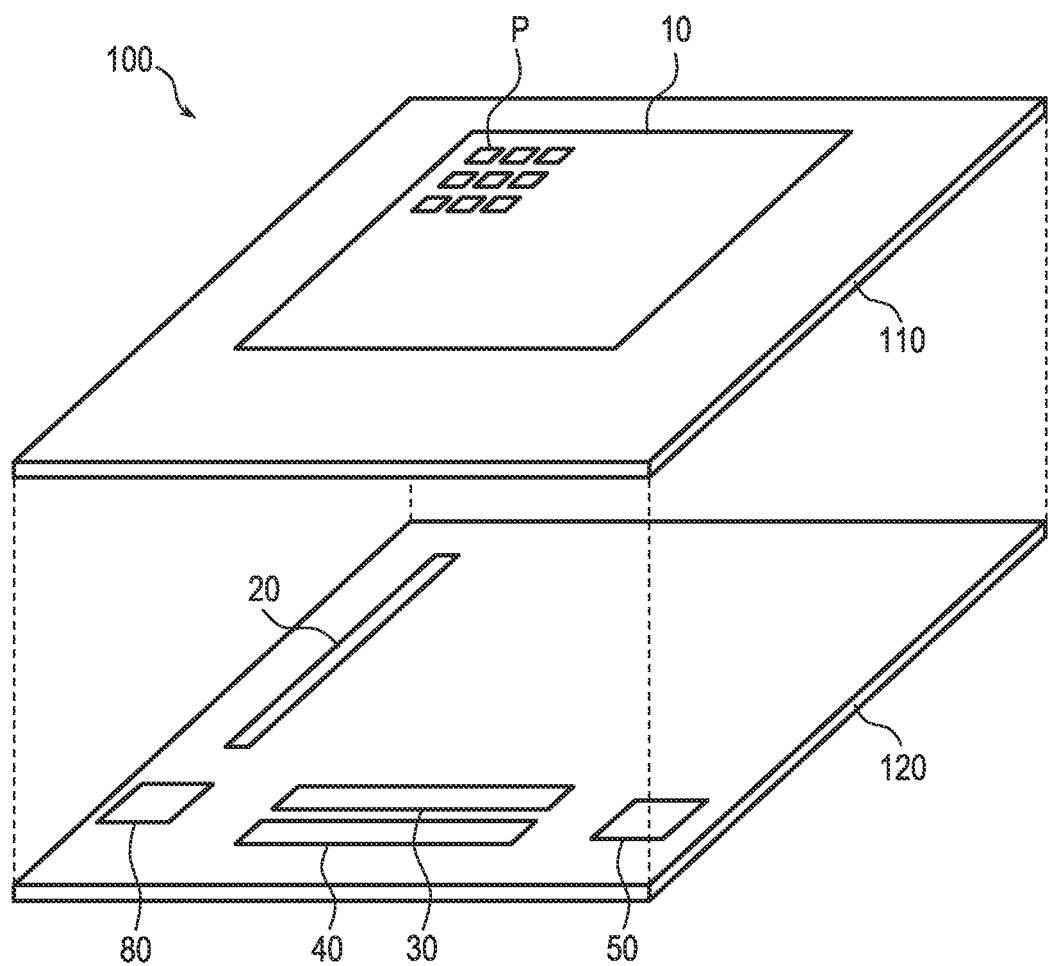
FIG. 2 is a perspective view illustrating a configuration example of the photoelectric conversion device according to the first embodiment of the present invention.
Figure 3:
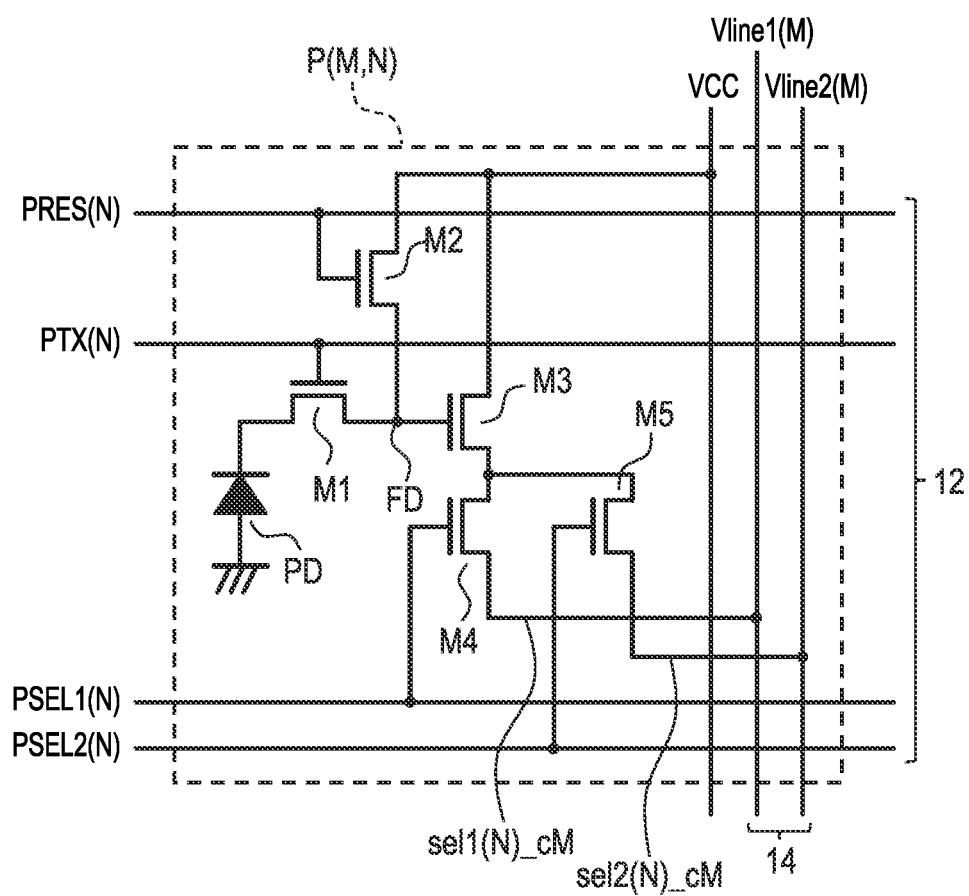
FIG. 3 is an equivalent circuit diagram illustrating a configuration example of a pixel in the photoelectric conversion device according to the first embodiment of the present invention.
Figure 4:
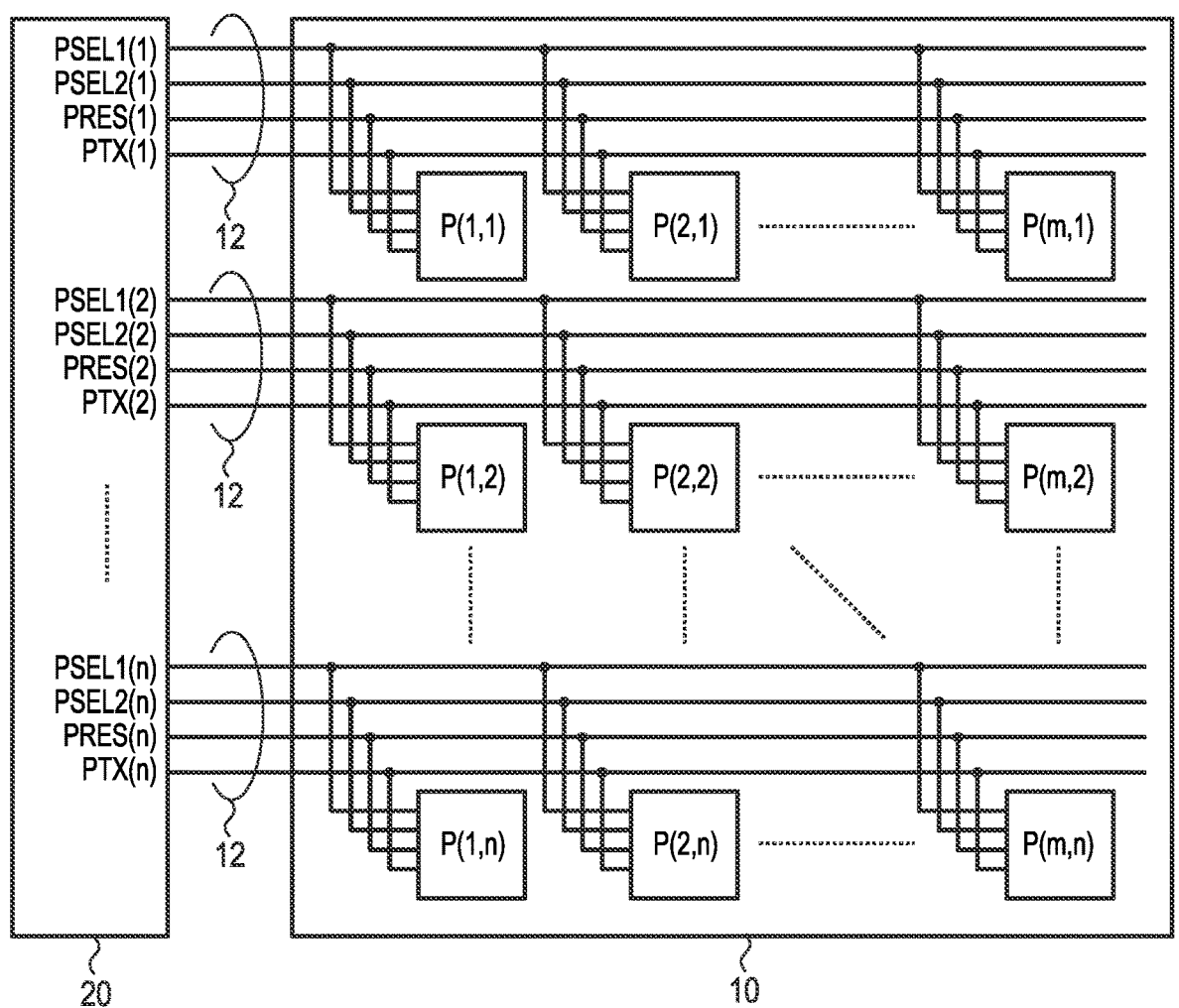
FIG. 4 is a schematic diagram illustrating a connection relationship between a vertical scanning unit and a pixel unit in the photoelectric conversion device according to the first embodiment of the present invention.
Figure 5:
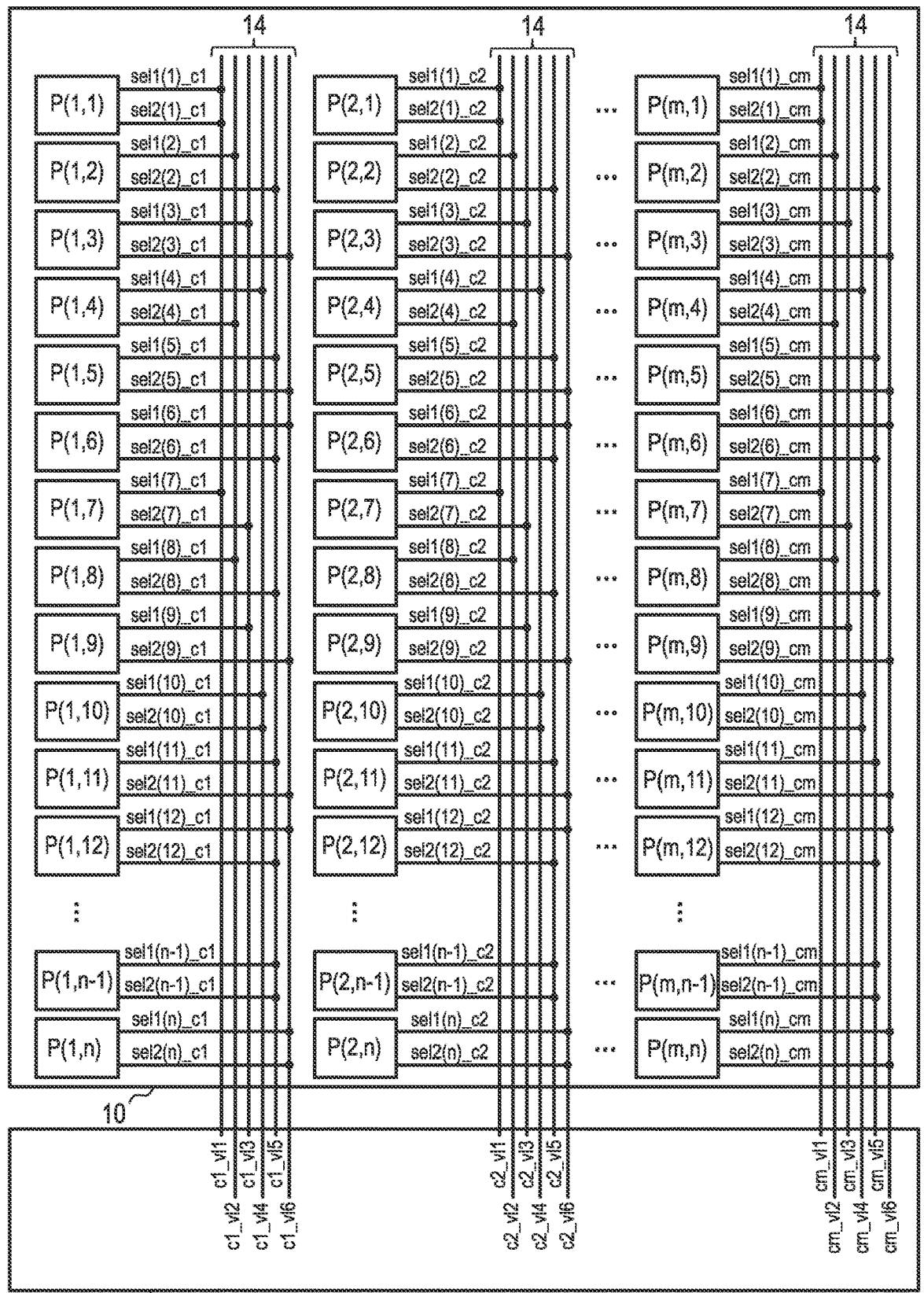
FIG. 5 is a schematic diagram illustrating a connection relationship between the pixel unit and a column circuit unit in the photoelectric conversion device according to the first embodiment of the present invention.
Figure 6A:
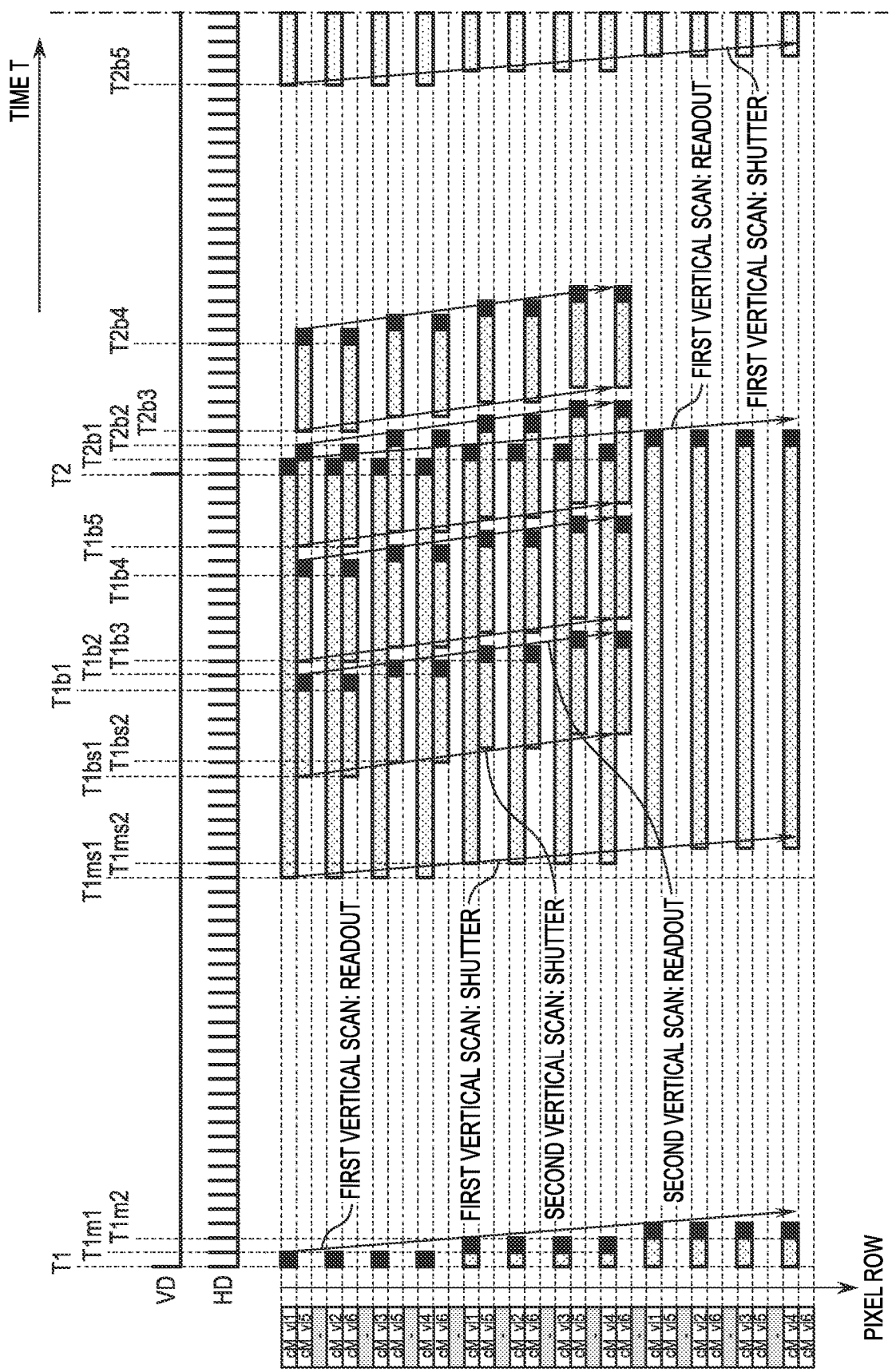
Figure 7:
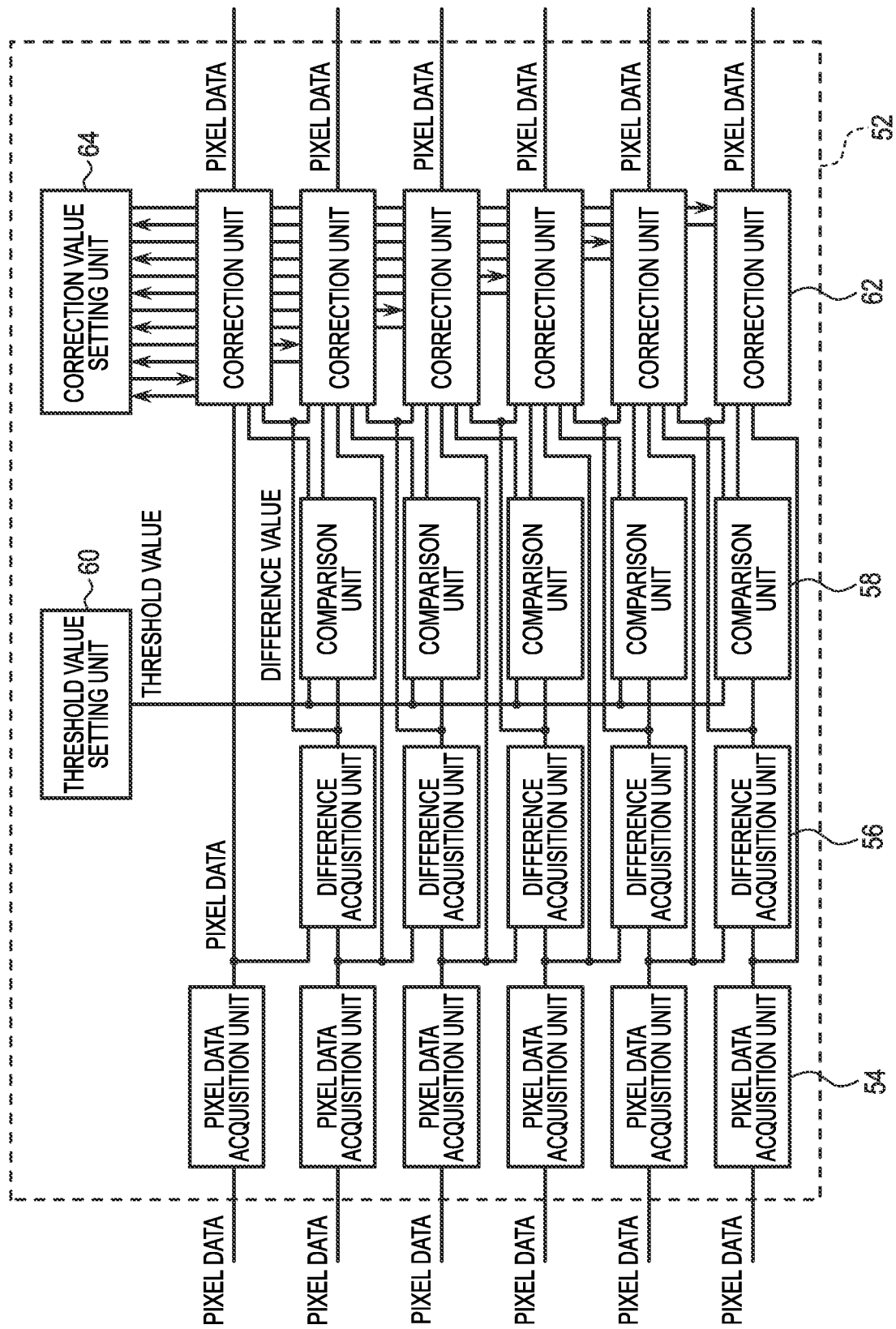
FIG. 7 is a block diagram illustrating a configuration example of an inter-vertical signal line coupling correction unit in the photoelectric conversion device according to the first embodiment of the present invention.
Figure 8:
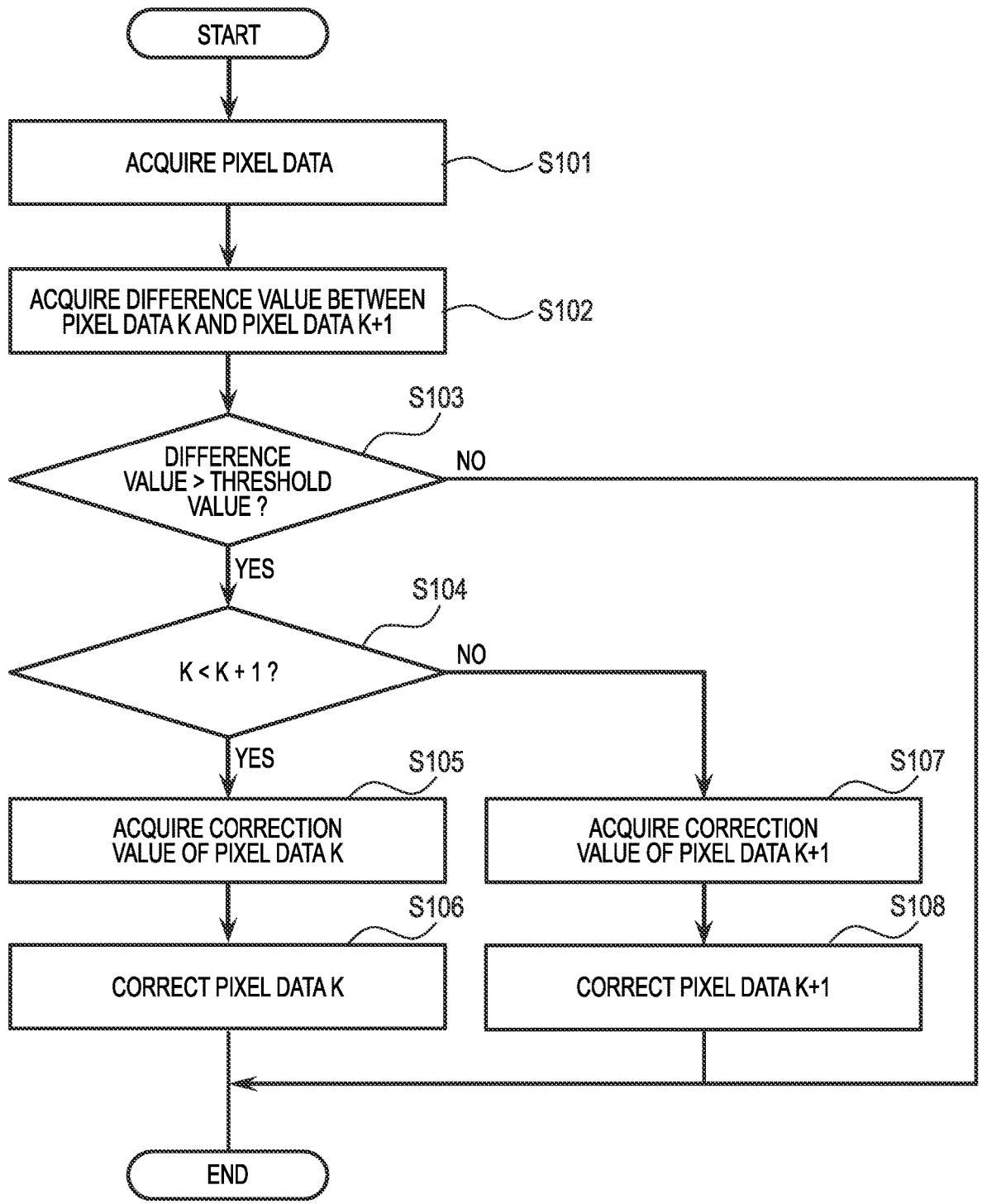
FIG. 8 is a flowchart illustrating an operation example of the inter-vertical signal line coupling correction unit in the photoelectric conversion device according to the first embodiment of the present invention.
Figure 9:
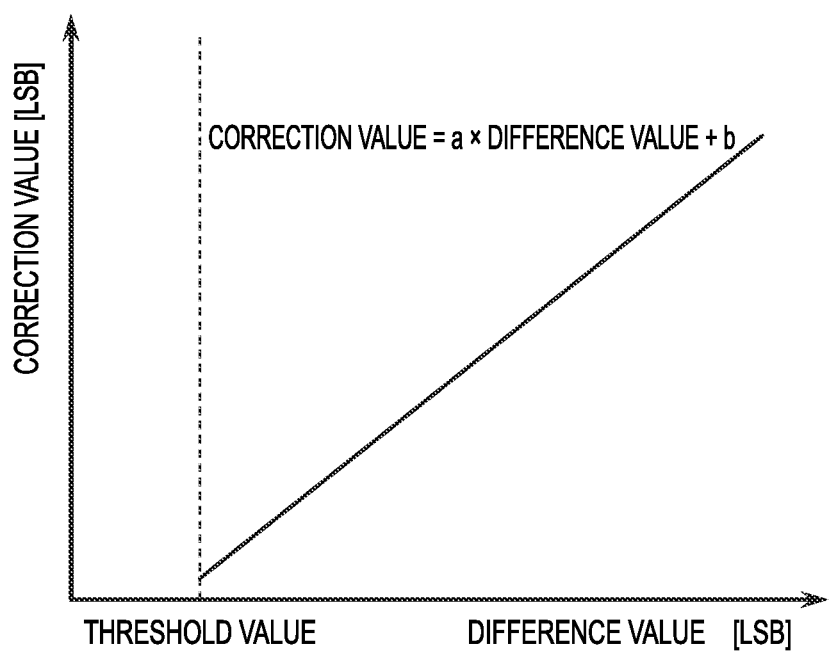

A photoelectric conversion device according to a first embodiment of the present invention will be described with reference to FIG. 1 to FIG. 10. FIG. 1 is a block diagram illustrating a configuration example of a photoelectric conversion device according to the present embodiment. FIG. 2 is a perspective view illustrating a configuration example of the photoelectric conversion device according to the present embodiment. FIG. 3 is an equivalent circuit diagram illustrating a configuration example of a pixel in the photoelectric conversion device according to the present embodiment. FIG. 4 is a schematic diagram illustrating a connection relationship between a vertical scanning unit and a pixel unit in the photoelectric conversion device according to the present embodiment. FIG. 5 is a schematic diagram illustrating a connection relationship between a pixel unit and a column circuit unit in the photoelectric conversion device according to the present embodiment. FIG. 6A and FIG. 6B are timing charts illustrating an operation example of the photoelectric conversion device according to the present embodiment. FIG. 7 is a block diagram illustrating a configuration example of an inter-vertical signal line coupling correction unit in the photoelectric conversion device according to the present embodiment. FIG. 8 is a flowchart illustrating an operation example of the inter-vertical signal line coupling correction unit in the photoelectric conversion device according to the present embodiment. FIG. 9 and FIG. 10 are diagrams illustrating a method of correcting pixel data in the photoelectric conversion device according to the present embodiment.

As illustrated in FIG. 1, the photoelectric conversion device 100 according to the present embodiment may include a pixel unit 10, a vertical scanning unit 20, a column circuit unit 30, a horizontal transfer unit 40, a signal processing unit 50, and a control unit 80. A vertical scanning unit 20 and a column circuit unit 30 are connected to the pixel unit 10. A horizontal transfer unit 40 is connected to the column circuit unit 30. A signal processing unit 50 is connected to the horizontal transfer unit 40. A control unit 80 is connected to the vertical scanning unit 20, the column circuit unit 30, the horizontal transfer unit 40, and the signal processing unit 50. A processing device 90 is connected to the control unit 80.

In the pixel unit 10, a plurality of pixels P each including a photoelectric conversion unit are two-dimensionally arranged so as to form a plurality of rows and a plurality of columns. Each of the plurality of pixels P is configured to output a pixel signal corresponding to an amount of light incident on the photoelectric conversion unit. In FIG. 1, the pixels P arranged in a matrix of m-number of columns×n-number of rows are represented by rectangular blocks. Some pixels P in FIG. 1 are denoted by reference numerals obtained by adding coordinates represented by (column number, row number) to reference numerals P of the pixels. In this specification, a direction in which each row extends (a row direction) is defined as a horizontal direction, and a direction in which each column extends (a column direction) is defined as a vertical direction. It is assumed that the row number of a head row is a first row and the column number of a head column is a first column.

The vertical scanning unit 20 is a control circuit (pixel control unit) that operates in response to a control signal from the control unit 80 and drives the pixels P constituting the pixel unit 10 in row basis. The operation executed by the vertical scanning unit 20 for the plurality of pixels P constituting the pixel unit 10 includes electronic shutter scan and readout scan. The electronic shutter scan refers to an operation in which exposure is started by sequentially releasing the reset state of the photoelectric conversion unit in row basis with respect to the pixels P in some or all of the rows of the pixel unit 10 so that the pixels P are in a state in which charge can be accumulated. The readout scan refers to an operation of sequentially outputting a signal corresponding to the amount of charge accumulated in the photoelectric conversion unit in row basis from the pixels P in some or all of the rows of the pixel unit 10. The vertical scanning unit 20 supplies control signals to the pixels P in row basis via control lines 12 arranged in each row of the pixel array. The vertical scanning unit 20 may be configured using a shift register or an address decoder.

The column circuit unit 30 is a signal processing circuit that performs predetermined processing on a signal output from the pixel unit 10. The column circuit unit 30 may include an amplifier circuit, an AD conversion (analog-to-digital conversion) circuit, and a memory (not illustrated). In this case, the column circuit unit 30 performs amplification processing and AD conversion processing on each pixel signal which is an analog signal output from the pixel P of each column of the pixel unit 10 via the vertical output line 14, and holds the pixel signal as digital data (pixel data) in the memory.

The horizontal transfer unit 40 operates in response to a control signal from the control unit 80, and sequentially transfers the pixel signals held in the memories of the respective columns of the column circuit unit 30 to the signal processing unit 50 for each column. The horizontal transfer unit 40 may be configured using a shift register or an address decoder.

The signal processing unit 50 may include a digital signal processing unit, a parallel/serial conversion unit, and an output unit (not illustrated). The digital signal processing unit includes an inter-vertical signal line coupling correction unit described later. The digital signal processing unit has a function of performing predetermined digital signal processing on the pixel signals transferred from the horizontal transfer unit 40. A specific configuration and operation of the digital signal processing unit will be described later. The parallel/serial conversion unit has a function of converting parallel data into serial data. The output unit includes an output circuit such as LVDS (Low Voltage Differential Signaling). The signal processing unit 50 performs digital signal processing on the signal output from the horizontal transfer unit 40, and outputs the signal as serial data to the outside of the photoelectric conversion device 100. Although the digital signal processing unit of the signal processing unit 50 is mounted on the photoelectric conversion device 100 in the present embodiment, the digital signal processing unit of the signal processing unit 50 may be a component different from the photoelectric conversion device 100. In this case, the signal processing unit 50 includes only the output unit.

The control unit 80 is a control circuit that receives a control signal such as a synchronization signal or a setting signal such as an operation mode from the processing device 90, and outputs a control signal for controlling the operation and timing to the vertical scanning unit 20, the column circuit unit 30, the horizontal transfer unit 40, and the signal processing unit 50.

The processing device 90 is, for example, a CPU (Central Processing Unit), and controls the overall operation of the photoelectric conversion device 100. The processing device 90 outputs the control signal such as a synchronization signal and the setting signal such as the operation mode to the control unit 80. The processing device 90 may be a part of the photoelectric conversion device 100, or may be provided in an imaging system in which the photoelectric conversion device 100 is mounted, i.e., outside the photoelectric conversion device 100 (refer to FIG. 1).

The photoelectric conversion device 100 according to the present embodiment may be formed on one substrate, or may be configured as a stacked-type photoelectric conversion device in which a plurality of substrates is stacked. In the latter case, for example, as illustrated in FIG. 2, a stacked photoelectric conversion device in which the pixel substrate 110 and the circuit substrate 120 are stacked and electrically connected can be configured. The pixel unit 10 among the constituent elements of the photoelectric conversion device 100 may be disposed on the pixel substrate 110. Further, among the components of the photoelectric conversion device 100, the vertical scanning unit 20, the column circuit unit 30, the horizontal transfer unit 40, the signal processing unit 50, and the control unit 80 may be disposed on the circuit substrate 120.

By configuring the photoelectric conversion device 100 in this manner, when manufacturing the photoelectric conversion device 100, an appropriate manufacturing process can be selected for each of the analog unit including the pixel unit 10 and the logic unit including the signal processing unit 50. Thereby, it is possible to realize a photoelectric conversion device in which the characteristics of each part of the photoelectric conversion device 100 are independently improved and thus the image quality is improved.

FIG. 3 is an equivalent circuit diagram illustrating a configuration example of the pixel P. FIG. 3 exemplifies the pixel P (M, N) arranged in the N-th row of the M-th column of the pixel unit 10, but the same applies to other pixels P. M is an integer of 1 to m, and N is an integer of 1 to n.

For example, as illustrated in FIG. 3, each pixel P may include a photoelectric conversion unit PD, a transfer transistor M1, a reset transistor M2, an amplifier transistor M3, and select transistors M4 and M5.

The photoelectric conversion unit PD may be constituted by a photoelectric conversion element such as a photodiode or a photogate. Here, it is assumed that the photoelectric conversion unit PD includes a photodiode. The photodiode constituting the photoelectric conversion unit PD has an anode node connected to the ground node and a cathode connected to a source of the transfer transistor M1. A drain of the transfer transistor M1 is connected to a source of the reset transistor M2 and a gate of the amplifier transistor M3. A connection node between the drain of the transfer transistor M1, the source of the reset transistor M2, and the gate of the amplifier transistor M3 is a so-called floating diffusion FD. A drain of the reset transistor M2 and a drain of the amplifier transistor M3 are connected to a power supply voltage node (voltage VCC). A source of the amplifier transistor M3 is connected to a drain of the select transistor M4 and a drain of the select transistor M5. A source of the select transistor M4 is connected to a signal line Vline1(M) via a signal line sel1(N)_cM. The source of the select transistor M5 is connected to a signal line Vline2(M) via a signal line sel2(N)_cM. The signal lines Vline1(M) and Vline2(M) are part of a plurality of signal lines constituting the vertical output line 14. The signal lines Vline1(M) and Vline2(M) may be the same signal line.

In the case of the pixel configuration illustrated in FIG. 3, each of the control lines arranged in each row of the pixel unit 10 includes a transfer gate signal line, a reset signal line, and two selection signal lines. For example, the transfer gate signal line of the N-th row is connected to the gates of the transfer transistors M1 of the pixels P of the N-th row, and supplies the control signal PTX(N) output from the vertical scanning unit 20 to the gates of the transfer transistors M1 of these pixels P. The reset signal line of the N-th row is connected to the gates of the reset transistors M2 of the pixels P of the N-th row, and supplies a control signal PRES(N) output from the vertical scanning unit 20 to the gates of the reset transistors M2 of these pixels P. The first selection signal line of the N-th row is connected to the gates of the select transistors M4 of the pixels P of the N-th row, and supplies a control signal PSEL1(N) output from the vertical scanning unit 20 to the gates of the select transistors M4 of these pixels P. The second selection signal line of the N-th row is connected to the gates of the select transistors M5 of the pixels P of the N-th row, and supplies a control signal PSEL2(N) output from the vertical scanning unit 20 to the gates of the select transistors M5 of these pixels P. A common control signal is supplied from the vertical scanning unit 20 to the pixels P of the same row.

When each transistor is formed of an n-channel transistor, when a high-level control signal is supplied from the vertical scanning unit 20, the corresponding transistor becomes conductive, and when a low-level control signal is supplied from the vertical scanning unit 20, the corresponding transistor becomes nonconductive. Here, it is assumed that the high-level corresponds to the logical value "1" and the low-level corresponds to the logical value "0". Each transistor included in the pixel P may be an n-channel transistor, but may be a p-channel transistor.

The photoelectric conversion unit PD converts (photoelectrically converts) incident light into electric charge of an amount corresponding to the amount of the incident light, and accumulates the generated charge. The transfer transistor M1 transfers charge held in the photoelectric conversion unit PD to the floating diffusion FD by turning on (transitioning to a conductive state). The floating diffusion FD includes a capacitance component, holds the charge transferred from the photoelectric conversion unit PD by the capacitance component, and becomes a potential corresponding to the amount of charge by charge-voltage conversion by the capacitance component.

The amplifier transistor M3 is configured such that a bias current is supplied from a current source (not illustrated) to the source via the signal line Vline1(M) and a select transistor M4 or via the signal line Vline2(M) and a select transistor M5. A power supply voltage (voltage VCC) is supplied to the drain of the amplifier transistor M3. That is, the amplifier transistor M3 constitutes a source follower circuit having a gate as an input node. Accordingly, the amplifier transistor M3 outputs a signal based on the potential of the floating diffusion FD to the signal line Vline1(M) via the select transistor M4 or to the signal line Vline2(M) via the select transistor M5.

The reset transistor M2 resets the floating diffusion FD to a potential corresponding to the power supply voltage (voltage VCC) by turning on (transitioning to conductive state). By turning on (transitioning to a conductive state) the transfer transistor M1 simultaneously with the reset transistor M2, the photoelectric conversion unit PD may be reset to a potential corresponding to the voltage VCC. The select transistor M4 switches the connection between the amplifier transistor M3 and the signal line Vline1. The select transistor M5 switches the connection between the amplifier transistor M3 and the signal line Vline2.

The electronic shutter scan is an operation of sequentially performing the shutter operation of the pixels P in row basis. In the shutter operation of the pixel P, the reset state of the photoelectric conversion unit PD is released. The photoelectric conversion unit PD is reset to a potential corresponding to the power supply voltage (voltage VCC) by turning on the transfer transistor M1 and the reset transistor M2. By turning off the transfer transistor M1 from the reset state, the reset state of the photoelectric conversion unit PD is released, and an exposure (accumulation of charge) of the photoelectric conversion unit PD is started.

The readout scan is an operation of sequentially performing the readout operation of the pixels P in row basis. In the readout operation of the pixel P, a readout processing of N data (noise data) and a readout processing of S data (signal data) are performed.

The readout processing of the N data is performed by releasing the reset state of the floating diffusion FD and then outputting a signal corresponding to the potential of the floating diffusion FD in the reset state to the signal line Vline1(M) or the signal line Vline2(M) by the amplifier transistor M3. The reset state of the floating diffusion FD is released by turning off the reset transistor M2. At this time, the select transistor M4 is turned on when the N data is read out to the signal line Vline1(M), and the select transistor M5 is turned on when the N data is read out to the signal line Vline2(M).

The readout processing of the S data is performed by transferring charge held by the photoelectric conversion unit PD to the floating diffusion FD after the readout processing of the N data and outputting a signal corresponding to the amount of charge transferred to the floating diffusion FD to the signal line Vline1(M) or the signal line Vline2(M). At this time, the select transistor M4 is turned on when the S data is read out to the signal line Vline1(M), and the select transistor M5 is turned on when the S data is read out to the signal line Vline2(M).

By performing correlated double sampling processing (S-N) on the S data and the N data thus read out, it is possible to acquire a pixel signal from which reset noise of the floating diffusion FD is removed.

Next, a connection relationship between the vertical scanning unit 20 and the pixel unit 10 will be described with reference to FIG. 4. The vertical scanning unit 20 receives a control signal from the control unit 80 and generates control signals PTX(N), PRES(N), PSEL1(N), and PSEL2(N). Then, the vertical scanning unit 20 outputs the generated control signals PTX(N), PRES(N), PSEL1(N), and PSEL2(N) to the pixels P(1, N) to P(m, N) of the N-th row via the control line 12. For example, control signals PTX(1), PRES(1), PSEL1(1), and PSEL2(1) are output to the pixels P(1, 1) to P(m, 1) of the first row. Control signals PTX(2), PRES(2), PSEL1(2), and PSEL2(2) are output to the pixels P(1, 2) to P (m, 2) of the second row. Control signals PTX(n), PRES(n), PSEL1(n), and PSEL2(n) are output to the pixels P(1,n) to P(m, n) of the n-th row.

By appropriately controlling the control signals PTX(N), PRES(N), PSEL1(N), and PSEL2(N) by the vertical scanning unit 20, the shutter operation and the readout operation of the pixels P(1, N) to P(m, N) of the N-th row may be performed. By sequentially controlling the control signals PTX(N), PRES(N), PSEL1(N), and PSEL2(N) of each row, shutter scan and readout scan may be performed.

Next, a connection relationship between the pixel unit 10 and the column circuit unit 30 will be described with reference to FIG. 5. A vertical output line 14 is arranged in each column of the pixel unit 10. Each of the vertical output lines 14 includes a predetermined number (k) of signal lines cM_vlK (K is an integer of 1 to k). In FIG. 5, it is assumed that the vertical output line 14 of each column include six signal lines. In this case, the vertical output line 14 of the first column includes signal lines c1_vl1, c1_vl2, c1_vl3, c1_vl4, c1_vl5, and c1_vl6. The vertical output line 14 of the second column includes signal lines c2_vl1, c2_vl2, c2 vl3, c2_vl4, c2_vl5, and c2_vl6. The vertical output line 14 of the m-th column includes signal lines cm_vl1, cm_vl2, cm_vl3, cm_vl4, cm_vl5, and cm_vl6. The above-described signal lines Vline1(M) and Vline2(M) are two of the signal lines cM_vl1 to cM_vlk. Each of the signal line sel1(N)_cM connected to the select transistor M4 of the pixel P(M, N) and the signal line sel2(N) cM connected to the select transistor M5 is connected to one of the signal lines cM_vl1 to cM_vlk. Hereinafter, a connection example of FIG. 5 will be specifically described.

First, the signal line sel1(N)_cM connected to the select transistor M4 of the pixel P(M, N) will be described.

The signal line sel1(N)_cM is connected to a predetermined signal line among the signal lines cM_vl1 to cM_vl6 in a 6-row cycle. For example, the signal line sel1(1)_cM is connected to the signal line cM_vl1. The signal line sel1(2)_cM is connected to the signal line cM_vl2. The signal line sel1(3)_cM is connected to the signal line cM_vl3. The signal line sel1(4)_cM is connected to the signal line cM_vl4. The signal line sel1(5)_cM is connected to the signal line cM_vl5. The signal line sel1(6)_cM is connected to the signal line cM_vl6. Similarly, each of the subsequent signal lines sel1(7)_cM to sel1(n)_cM is connected to a predetermined signal line among the signal lines cM_vl1 to cM_vl6 in a 6-row cycle. For example, the signal line sel1(7)_cM is connected to the signal line cM_vl1. The signal line sel1(12)_cM is connected to the signal line cM_vl6. The signal line sel1(n)_cM is connected to the signal line cM_vl6.

Note that although the signal line sel1(N)_cM is connected in the order of the signal lines cM_vl1, cM_Vl2, cM_vl3, cM_vl4, cM_vl5, cM_vl6, cM_vl1, . . . , in accordance with the order of the rows, the order of connection is not necessarily limited to this order. The signal lines sel1 (N)_cM of six consecutive rows may be connected to different signal lines among the signal lines cM_vl1 to cM_vl6.

Next, the signal line sel2(N)_cM connected to the select transistor M5 of the pixel P(M, N) will be described. The signal line sel2(N)_cM will be described separately for signal lines connected to the signal lines cM_vl1 to cM_vl4 and signal lines connected to the signal lines cM_vl5 and cM_vl6.

First, the signal lines connected to the signal lines cM_vl1 to cM_vl4 among the signal lines sel2(N)_cM will be described. Of the signal lines sel2(N)_cM, a signal line sel2(12i+1)_cM is connected to the signal line cM_vl1. A signal line sel2(12i+4)_cM is connected to the signal line cM_vl2. A signal line sel2(12i+7)_cM is connected to the signal line cM_vl3. A signal line sel2(12i+10)_cM is connected to the signal line cM_vl4. Here, i is an integer of 0 to (n/12−1). For example, the signal line sel2(1)_cM is connected to the signal line cM_vl1. The signal line sel2(4)_cM is connected to the signal line cM_vl2. The signal line sel2(7)_cM is connected to the signal line cM_vl3. The signal line sel2(10)_cM is connected to the signal line cM_vl4. Similarly, each of the subsequent signal lines sel1(13)_cM to sel1 (n−2)_cM is connected to a predetermined one of the signal lines cM_vl1 to cM_vl4 in a 12-row cycle.

Here, although each of the signal lines sel2(N)_cM is connected to a predetermined signal line among the signal lines cM_vl1 to cM_vl4 at intervals of two rows, the signal lines sel2(N)_cM connected to the signal lines cM_vl1 to cM_vl4 need not necessarily be at intervals of two rows. The signal line sel2(N)_cM may be connected to a predetermined signal line among the signal lines cM_vl1 to cM_vl4 at intervals of S rows (S is an integer equal to or greater than 2). The order in which the signal line sel2(N)_cM is connected to the signal lines cM_vl1, cM_Vl2, cM_vl3, and cM_vl4 is not necessarily the order of rows. It is sufficient that four signal lines sel2(N)_cM respectively connected to the signal lines cM_vl1 to cM_vl4 are present among the signal lines sel2(N)_cM of consecutive (S+1)×4 rows.

Next, signal lines connected to the signal lines cM_vl5 and cM_vl6 among the signal lines sel2(N)_cM will be described. Of the signal lines sel2(N)_cM, a signal line sel2(6j+2)_cM is connected to the signal line cM_vl5. A signal line sel2(6j+5)_cM is connected to the signal line cM_vl6. Here, j is an integer of 0 to (n/6−1). For example, the signal line sel2(2) cM is connected to the signal line cM_vl5. The signal line sel2(5)_cM is connected to the signal line cM_vl6. Similarly, each of the subsequent signal lines sel1 (8)_cM to sel1 (n−1)_cM is connected to a predetermined one of the signal lines cM_vl5 and cM_vl6 in a 6-row cycle.

Here, although the signal line sel2(N)_cM is connected to a predetermined signal line among the signal lines cM_vl5 and cM_vl6 at intervals of two rows, the signal line sel2(N)_cM connected to the signal lines cM_vl5 and cM_vl6 need not necessarily be at intervals of two rows. The signal line sel2(N)_cM may be connected to a predetermined signal line among the signal lines cM_vl5 and cM_vl6 at intervals of S rows (S is an integer equal to or greater than 2). The order in which the signal line sel2(N)_cM is connected to the signal lines cM_vl5 and cM_Vl6 is not necessarily the order of rows. It is sufficient that two signal lines sel2(N)_cM respectively connected to the signal lines cM_vl5 and cM_vl6 are present among the signal lines sel2(N)_cM of consecutive (S+1)×2 rows.

Among the signal lines sel2(N)_cM, the signal line sel2(N)_cM of the pixel P of the row other than the above may be connected to any one of the signal lines cM_vlK.

For example, the signal line sel2(6j+3) may be connected to the signal line cM_vl6, and the signal line sel2(6n+6) may be connected to the signal line cM_vl5. Here, j is an integer of 0 to (n/6−1). According to this connection, a pixel signal of the pixel P of the (6j+2)-th row and a pixel signal of the pixel P of the (6n+6)-th row may be analog-added on the signal line cM_vl5. The pixel signals of the pixels P of the (6n+3)-th row and the pixel signals of the pixels P of the (6n+5)-th row may be added on the signal line cM_vl6 in an analog signal (hereinafter called an analog addition).

Alternatively, the signal line sel2(12i+3) may be connected to the signal line cM_vl1, and the signal line sel2 (12i+6) may be connected to the signal line cM_vl2. The signal line sel2(12i+9) may be connected to the signal line cM_vl3, and the signal line sel2(12i+12) may be connected to the signal line cM_vl4. Here, i is an integer of 0 to (n/12−1). According to this connection, an analog addition of the pixel signals may be performed on the signal lines cM_vl1 to cM_vl4. Specifically, an analog addition of the pixel signal of the pixel P of the (12i+1)-th row and the pixel signal of the pixel P of the (12i+3)-th row may be performed on the signal line cM_vl1. Further, an analog addition of the pixel signal of the pixel P of the (12i+4)-th row and the pixel signal of the pixel P of the (12i+6)-th row may be performed on the signal line cM_vl2. Further, an analog addition of the pixel signal of the pixel P of the (12i+7)-th row and the pixel signal of the pixel P of the (12i+9)-th row may be performed on the signal line cM_vl3. Further, an analog addition of the pixel signal of the pixel P of the (12i+10)-th row and the pixel signal of the pixel P of the (12i+12)-th row may be performed on the signal line cM_vl4.

By such connection, the number of the select transistors M4 and M5 connected to each of the six signal lines cM_vlK arranged in each column becomes the same, and parasitic capacitance (capacitance component of transistors) connected to the signal line cM_vlK may be made uniform.

Next, an operation example of the photoelectric conversion device according to the present embodiment will be described with reference to FIG. 6A and FIG. 6B. FIG. 6A and FIG. 6B are timing charts illustrating an operation example of the photoelectric conversion device according to the present embodiment. In FIG. 6A and FIG. 6B, one timing diagram is divided into two drawings by a one-dot-chain line portion. FIG. 6B illustrates the operation at a time later than the time represented in FIG. 6A.

In this operation example, while the image data from the first row to the (3p+1)-th row is acquired in the first vertical scan, the image data from the second row to the (3q+2)-th row is acquired in the second vertical scan. Here, p and q are integers of 1 or more. The image obtained by the first vertical scan may be used as, for example, an image captured for live view. The image obtained by the second vertical scan may be used as, for example, an image for flicker detection.

When image data is acquired by readout scan, only the select transistor M5 of the pixel P is used, and pixel signals are readout from the six signal lines cM_vl1 to cM_vl6 arranged in each column. At this time, four of the six signal lines cM_vl1 to cM_vl6 arranged in each column (the signal lines cM_vl1 to cM_vl4) are used in the readout operation of the first vertical scan. In the readout operation of the second vertical scan, two of the six signal lines cM_vl1 to cM_vl6 arranged in each column (the signal lines cM_vl5 and cM_vl6) are used.

Here, in a first frame, a first vertical scan including one shutter scan and one readout scan and a second vertical scan including three shutter scans and two readout scans are executed. In a second frame, a first vertical scan including one shutter scan and one readout scan and a second vertical scan including one shutter scan and two readout scans are executed. In a third frame, a first vertical scan including one shutter scan and one readout scan is executed. In FIG. 6A and FIG. 6B, a period defined at an interval of the vertical synchronization signal VD is one frame period. A period from time T1 to time T2 is the first frame, a period from the time T2 to time T3 is the second frame, and a period from the time T3 to time T4 is the third frame.

First, a readout operation of the first vertical scan is started from the time T1 which is a start time of the first frame. A period from the time T1 to time T1$m$1 after one horizontal period defined at an interval of the horizontal synchronization signal HD has elapsed is a period during which the pixel signals are read out from the pixels P of the first, fourth, seventh, and tenth rows. The vertical scanning unit 20 controls the control signals PTX(N), PRES(N), PSEL1(N), and PSEL2(N), and reads out a pixel signal corresponding to an amount of charge accumulated in the photoelectric conversion unit PD during a period up to the time T1 from each of the pixels P of the first, fourth, seventh, and tenth rows. At this time, the pixel signal of the pixel P of each row is output to the signal line cM_vlK via the select transistor M5 and the signal line sel2(N)_cM. That is, each of the pixel signals of the pixels P of the first row is read out from the signal line cM_vl1, each of the pixel signals of the pixels P of the fourth row is read out from the signal line cM_vl2, each of the pixel signals of the pixels P of the seventh row is read out from the signal line cM_vl3, and each of the pixel signals of the pixels P of the tenth row is read out from the signal line cM_vl4.

A period from the time T1$m$1 to time T1$m$2 after one horizontal period has elapsed is a period during which the pixel signals are read out from the pixels P of a thirteenth row, a sixteenth row, a nineteenth row, and a twenty-second row. The vertical scanning unit 20 controls the control signals PTX(N), PRES(N), PSEL1(N), and PSEL2(N), and reads out a pixel signal corresponding to an amount of charge accumulated in the photoelectric conversion unit PD during a period up to the time T1$m$1 from each of the pixels P of the thirteenth row, the sixteenth row, the nineteenth row, and the twenty-second row. At this time, the pixel signal of the pixel P of each row is output to the signal line cM_vlK via the select transistor M5 and the signal line sel2(N)_cM. That is, each of the pixel signals of the pixels P of the thirteenth row is read out from the signal line cM_vl1, and each of the pixel signals of the pixels P of the sixteenth row is read out from the signal line cM_vl2. Each of the pixel signals of the pixels P of the nineteenth row is read out from the signal line cM_vl3, and each of the pixel signals of the pixels P of the twenty-second row is read out from the signal line cM_vl4.

After the time T1$m$2, similarly to the period from the time T1 to the time T1$m$1 and the period from the time T1$m$1 to the time T1$m$2, in synchronization with the horizontal synchronization signal HD, the readout operation is sequentially performed for every four rows at a cycle of one row for every three rows (two row intervals) from the twenty-fifth row to the (3p+1)-th row. A series of readout operations performed on the pixels P from the first row to the (3p+1)-th row in this manner is the readout scan by the first vertical scan of the first frame.

From subsequent time T1$ms$1, a shutter operation corresponding to the readout operation of the first vertical scan of the second frame is started. A period from the time T1$ms$1 to time T1$ms$2 after one horizontal period has elapsed is a period during which the shutter operation of the pixels P of the first row, the fourth row, the seventh row, and the tenth row is performed. The vertical scanning unit 20 controls the control signals PTX(N), PRES(N), PSEL1(N), and PSEL2(N), and releases the reset state of the photoelectric conversion unit PD of each of the pixels P of the first row, the fourth row, the seventh row, and the tenth row.

After the time T1$ms$2, similarly to the period from the time T1$ms$1 to the time T1$ms$2, in synchronization with the horizontal synchronization signal HD, the shutter operation is sequentially performed for every four rows at a cycle of one row for every three rows (two row intervals) from thirteenth row to the (3p+1)-th row. A series of shutter operations performed on the pixels P from the first row to the (3p+1)-th row in this manner is the shutter scan by the first vertical scan of the first frame.

From subsequent time T1$bs$1, the first shutter operation of the second vertical scan is started. A period from the time T1$bs$1 to time T1$bs$2 after one horizontal period has elapsed is a period during which the shutter operation of the pixels P of the second row and the fifth row is performed. The vertical scanning unit 20 controls the control signals PTX(N), PRES(N), PSEL1(N), and PSEL2(N), and releases the reset state of the photoelectric conversion unit PD of each of the pixels P of the second row and the fifth row.

After the time T1$bs$2, similar to the period from the time T1$bs$1 to the time T1$bs$2, in synchronization with the horizontal synchronization signal HD, the shutter operation is sequentially performed for every two rows at a cycle of one row for every three rows (two row intervals) from the eighth row to the (3q+2)-th row. A series of shutter operations performed on the pixels P from the second row to the (3q+2)-th row in this manner is the first shutter scan by the second vertical scan of the first frame.

From subsequent time T1$b$1, the first readout operation of the second vertical scan is started. A period from the time T1$b$1 to time T1$b$2 after one horizontal period has elapsed is a period during which the readout operation of the pixel signals from the pixels P of the second row and the fifth row. The vertical scanning unit 20 controls the control signals PTX(N), PRES(N), PSEL1(N), and PSEL2(N), and reads out a pixel signal corresponding to an amount of charge accumulated in the photoelectric conversion unit PD during the period up to the time T1$b$1 from each of the pixels P of the second row and the fifth row. At this time, the pixel signal of the pixel P of each row is output to the signal line cM_vlK via the select transistor M5 and the signal line sel2(N)_cM. That is, each of the pixel signals of the pixels P of the second row is read out from the signal line cM_vl5, and each of the pixel signals of the pixels P of the fifth row is read out from the signal line cM_vl6.

A period from time T1$b$2 to time T1$b$3 after one horizontal period has elapsed is a period during which the pixel signals are read out from the pixels P of the eighth row and the eleventh row. The vertical scanning unit 20 controls the control signals PTX(N), PRES(N), PSEL1(N), and PSEL2(N), and reads out a pixel signal corresponding to an amount of charge accumulated in the photoelectric conversion unit PD during the period up to the time T1$b$2 from each of the pixels P of the eighth row and the eleventh row. At this time, the pixel signal of the pixel P of each row is output to the signal line cM_vlK via the select transistor M5 and the signal line sel2(N)_cM. That is, each of the pixel signals of the pixels P of the eighth row is read out from the signal line cM_vl5, and each of the pixel signals of the pixels P of the eleventh row is read out from the signal line cM_vl6.

After the time T1$b$3, similar to the period from the time T1$b$1 to the time T1$b$2 and the period from the time T1$b$2 to the time T1$b$3, in synchronization with the horizontal synchronization signal HD, the readout operation is sequentially performed for two rows for every six rows (two row intervals) from the fourteenth row to the (3q+2)-th row. A series of readout operations performed on the pixels P from the second row to the (3q+2)-th row in this manner is the first readout scan by the second vertical scan of the first frame.

Further, from time T1*b*3, the second shutter operation of the second vertical scan is started in parallel with the first readout operation of the second vertical scan. A period until one horizontal period elapses from the time T1*b*3 is a period during which the shutter operation of the pixels P of the second row and the fifth row is performed. The vertical scanning unit 20 controls the control signals PTX(N), PRES (N), PSEL1(N), and PSEL2(N), and releases the reset state of the photoelectric conversion unit PD of each of the pixels P of the second row and the fifth row.

Thereafter, similarly to the period from the time T1*b*3, in synchronization with the horizontal synchronization signal HD, the shutter operation is sequentially performed for two rows for every six rows (two row intervals) from the eighth row to the (3q+2)-th row. A series of shutter operations performed on the pixels P from the second row to the (3q+2)-th row in this manner is the second shutter scan by the second vertical scan of the first frame.

From the subsequent time T1*b*4, the second readout operation of the second vertical scan is started. A period until one horizontal period elapses from the time T1*b*4 is a period during which the pixel signals are read out from the pixels P of the second row and the fifth row. The vertical scanning unit 20 controls the control signals PTX(N), PRES(N), PSEL1(N), and PSEL2(N), and reads out a pixel signal corresponding to an amount of charge accumulated in the photoelectric conversion unit PD during the period up to the time T1*b*4 from each of the pixels P of the second row and the fifth row. At this time, the pixel signal of the pixel P of each row is output to the signal line cM_vlK via the select transistor M5 and the signal line sel2(N)_cM. That is, each of the pixel signals of the pixels P of the second row is read out from the signal line cM_vl5, and each of the pixel signals of the pixels P of the fifth row is read out from the signal line cM_vl6.

Thereafter, similarly to the period from the time T1*b*4, in synchronization with the horizontal synchronization signal HD, the readout operation is sequentially performed for two rows for every six rows (two row intervals) from the eighth row to the (3q+2)-th row. A series of readout operations performed on the pixels P from the second row to the (3q+2)-th row in this manner is the second readout scan by the second vertical scan of the first frame.

From the subsequent time T1*b*5, the third shutter operation of the second vertical scan is started in parallel with the second readout operation of the second vertical scan. A period until one horizontal period elapses from the time T1*b*5 is a period during which the shutter operation of the pixels P of the second row and the fifth row is performed. The vertical scanning unit 20 controls the control signals PTX(N), PRES(N), PSEL1(N), and PSEL2(N), and releases the reset state of the photoelectric conversion unit PD of each of the pixels P of the second row and the fifth row.

Thereafter, similarly to the period from the time T1*b*5, in synchronization with the horizontal synchronization signal HD, the shutter operation is sequentially performed for two rows for every six rows (two row intervals) from the eighth row to the (3q+2)-th row. A series of shutter operations performed on the pixels P from the second row to the (3q+2)-th row in this manner is the second shutter scan by the second vertical scan of the first frame.

Next, the readout operation of the first vertical scan is started from time T2 which is a start time of the second frame. A period from the time T2 to time T2*b*1 after one horizontal period has elapsed is a period during which the pixel signals are read out from the pixels P of the first row, the fourth row, the seventh row, and the tenth row. The vertical scanning unit 20 controls the control signals PTX (N), PRES(N), PSEL1(N), and PSEL2(N), and reads out the pixel signal corresponding to an amount of charge accumulated in the photoelectric conversion unit PD during the period up to the time T2 from each of the pixels P of the first row, the fourth row, the seventh row, and the tenth row. At this time, the pixel signal of the pixel P of each row is output to the signal line cM_vlK via the select transistor M5 and the signal line sel2(N)_cM. That is, each of the pixel signals of the pixels P of the first row is read out from the signal line cM_vl1, each of the pixel signals of the pixels P of the fourth row is read out from the signal line cM_vl2, each of the pixel signals of the pixels P of the seventh row is read out from the signal line cM_vl3, and each of the pixel signal of the pixel P of the tenth row is read out from the signal line cM_vl4.

A period from the time T2*b*1 to time T2*b*2 after one horizontal period has elapsed is a period during which the pixel signals are read out from the pixels P of the thirteenth row, the sixteenth row, the nineteenth row, and the twenty-second row. The vertical scanning unit 20 controls the control signals PTX(N), PRES(N), PSEL1(N), and PSEL2 (N), and reads out the pixel signal corresponding to an amount of charge accumulated in the photoelectric conversion unit PD during the period up to the time T2*b*1 from each of the pixels P of the thirteenth row, the sixteenth row, the nineteenth row, and the twenty-second row. At this time, the pixel signal of the pixel P of each row is output to the signal line cM_vlK via the select transistor M5 and the signal line sel2(N)_cM. That is, each of the pixel signals of the pixels P of the thirteenth row is read out from the signal line cM_vl1, and each of the pixel signals of the pixels P of the sixteenth row is read out from the signal line cM_vl2. Each of the pixel signals of the pixels P of the nineteenth row is read out from the signal line cM_vl3, and each of the pixel signals of the pixels P of the twenty-second row is read out from the signal line cM_vl4.

Similarly, a period from time T2*b*1 to time T2*b*2 after one horizontal period has elapsed is also a period during which the pixel signals are read out from the pixels P of the second row and the fifth row. The vertical scanning unit 20 controls the control signals PTX(N), PRES(N), PSEL1(N), and PSEL2(N), and reads out a pixel signal corresponding to an amount of charge accumulated in the photoelectric conversion unit PD during the period up to the time T2*b*1 from each of the pixels P of the second row and the fifth row. At this time, the pixel signal of the pixel P of each row is output to the signal line cM_vlK via the select transistor M5 and the signal line sel2(N)_cM. That is, each of the pixel signals of the pixels P of the second row is read out from the signal line cM_vl5, and each of the pixel signals of the pixels P of the eighth row is read out from the signal line cM_vl6.

After the time T2*b*2, similar to the period from the time T2 to the time T2*b*1 and the period from the time T2*b*1 to the time T2*b*2, in synchronization with the horizontal synchronization signal HD, the readout operation is sequentially performed for four rows for every twelve rows (two row intervals) from the twenty-fifth row to the (3p+1)-th row. A series of readout operations performed on the pixels P from the first row to the (3p+1)-th row in this manner is the readout scan by the first vertical scan of the second frame.

In addition, similarly to the period from the time T2b1 to the time T2b2, in synchronization with the horizontal synchronization signal HD, the readout operation is sequentially performed for two rows for every six rows (two row intervals) from the eighth row to the (3q+2)-th row. A series of readout operations performed on the pixels P from the second row to the (3q+2)-th row in this manner is the first readout scan by the second vertical scan of the second frame.

From subsequent time T2b3, the first shutter operation of the second vertical scan is started in parallel with the first readout operation of the second vertical scan. A period until one horizontal period elapses from the time T2b3 is a period during which the shutter operation of the pixels P of the second row and the fifth row is performed. The vertical scanning unit 20 controls the control signals PTX(N), PRES(N), PSEL1(N), and PSEL2(N), and releases the reset state of the photoelectric conversion unit PD of each of the pixels P of the second row and the fifth row.

Thereafter, similarly to the period from the time T2b3, in synchronization with the horizontal synchronization signal HD, the shutter operation is sequentially performed for two rows for every six rows (two row intervals) from the eighth row to the (3q+2)-th row. A series of shutter operations performed on the pixels P from the second row to the (3q+2)-th row in this manner is the first shutter scan by the second vertical scan of the second frame.

From subsequent time T2b4, the second readout operation of the second vertical scan is started. A period until one horizontal period elapses from the time T2b4 is a period during which the pixel signals are read out from the pixels P of the second row and the fifth row. The vertical scanning unit 20 controls the control signals PTX(N), PRES(N), PSEL1(N), and PSEL2(N), and reads out a pixel signal corresponding to an amount of charge accumulated in the photoelectric conversion unit PD during the period up to the time T2b4 from each of the pixels P of the second row and the fifth row. At this time, the pixel signal of the pixel P of each row is output to the signal line cM_vlK via the select transistor M5 and the signal line sel2(N)_cM. That is, each of the pixel signals of the pixels P of the second row is read out from the signal line cM_vl5, and each of the pixel signal of the pixel P of the fifth row is read out from the signal line cM_vl6.

Thereafter, similarly to the period from the time T2b4, in synchronization with the horizontal synchronization signal HD, the readout operation is sequentially performed for two rows for every six rows (two row intervals) from the eighth row to the (3q+2)-th row. A series of readout operations performed on the pixels P from the second row to the (3q+2)-th row in this manner is the second readout scan by the second vertical scan of the second frame.

From subsequent time T2b5, the shutter operation of the first vertical scan is started. A period until one horizontal period elapses from the time T2b5 is a period during which the shutter operation of the pixels P of the first row, the fourth row, the seventh row, and the tenth row is performed. The vertical scanning unit 20 controls the control signals PTX(N), PRES(N), PSEL1(N), and PSEL2(N), and releases the reset state of the photoelectric conversion unit PD of each of the pixels P of the first row, the fourth row, the seventh row, and the tenth row.

Thereafter, similarly to the period from the time T2b5, in synchronization with the horizontal synchronization signal HD, the shutter operation is sequentially performed for four rows for every twelve rows (two row intervals) from the thirteenth row to the (3p+1)-th row. A series of shutter operations performed on the pixels P from the first row to the (3p+1)-th row in this manner is the shutter scan by the first vertical scan of the second frame.

Next, the readout operation of the first vertical scan is started from time T3, which is a start time of the third frame. A period until one horizontal period elapses from the time T3 is a period during which the pixel signals are read out from the pixels P of the first row, the fourth row, the seventh row, and the tenth row. The vertical scanning unit 20 controls the control signals PTX(N), PRES(N), PSEL1(N), and PSEL2(N), and reads out a pixel signal corresponding to an amount of charge accumulated in the photoelectric conversion unit PD during the period up to the time T3 from each of the pixels P of the first row, the fourth row, the seventh row, and the tenth row. At this time, the pixel signal of the pixel P of each row is output to the signal line cM_vlK via the select transistor M5 and the signal line sel2(N)_cM. That is, each of the pixel signals of the pixels P of the first row is read out from the signal line cM_vl1, each of the pixel signals of the pixels P of the fourth row is read out from the signal line cM_vl2, each of the pixel signals of the pixels P of the seventh row is read out from the signal line cM_vl3, and each of the pixel signals of the pixels P of the tenth row is read out from the signal line cM_vl4.

Thereafter, similarly to the period from the time T3, in synchronization with the horizontal synchronization signal HD, the readout operation is sequentially performed for four rows for every twelve rows (two row intervals) from the thirteenth row to the (3p+1)-th row. A series of readout operations performed on the pixels P from the first row to the (3p+1)-th row in this manner is the readout scan by the first vertical scan of the third frame.

From subsequent time T3b1, the shutter operation corresponding to the readout operation of the first vertical scan of the third frame is started. A period until one horizontal period elapses from the time T3b1 is a period during which the shutter operation of the pixels P of the first row, the fourth row, the seventh row, and the tenth row is performed. The vertical scanning unit 20 controls the control signals PTX(N), PRES(N), PSEL1(N), and PSEL2(N), and releases the reset state of the photoelectric conversion unit PD of each of the pixels P of the first row, the fourth row, the seventh row, and the tenth row.

Thereafter, similarly to the period from the time T3b1, in synchronization with the horizontal synchronization signal HD, the shutter operation is sequentially performed for four rows for every twelve rows (two row intervals) from the thirteenth row to the (3p+1)-th row. A series of shutter operations performed on the pixels P from the first row to the (3p+1)-th row in this manner is the shutter scan by the first vertical scan of the third frame.

Next, the readout operation of the first vertical scan is started from time T4, which is a start time of the fourth frame. A period until one horizontal period elapses from the time T4 is a period during which the pixel signals are read out from the pixels P of the first row, the fourth row, the seventh row, and the tenth row. The vertical scanning unit 20 controls the control signals PTX(N), PRES(N), PSEL1(N), and PSEL2 (N), and reads out a pixel signal corresponding to an amount of charge accumulated in the photoelectric conversion unit PD during the period up to the time T4 from each of the pixels P of the first row, the fourth row, the seventh row, and the tenth row. At this time, the pixel signal of the pixel P of each row is output to the signal line cM_vlK via the select transistor M5 and the signal line sel2(N)_cM. That is, each of the pixel signals of the pixels P of the first row is read out from the signal line cM_vl1, each of the pixels signal of the pixels P of the fourth row is read out from the signal line cM_vl2, each of the pixel signals of the pixels P of the seventh row is read out from the signal line cM_vl3, and each of the pixel signal of the pixel P of the tenth row is read out from the signal line cM_vl4.

Thereafter, similarly to the period from the time T4, in synchronization with the horizontal synchronization signal HD, the readout operation is sequentially performed for four rows for every twelve rows (two row intervals) from the thirteenth row to the (3p+1)-th row. A series of the readout operations performed on the pixels P from the first row to the (3p+1)-th row in this manner is the readout scan by the first vertical scan of the fourth frame.

When two different vertical scans are performed at the same time, a state occurs in which one of the vertical scans performs a readout scan on a pixel at a position separated in the column direction from a pixel on which a readout scan of another one of the vertical scans to output a pixel signal to another signal line cM_vlK is performed at the same time. For example, in the above example, since a part of the readout operation of the first vertical scan and the readout operation of the second vertical scan are performed in a period overlapped with each other in a period from the time T2 to the time T3, a state in which the pixel signals of the pixels P arranged in a distant row are read out in the same period may occur. In such a case, if a strong light source or the like exists in a pixel region in which one of the vertical scans is reading out, and the signal level of the signal line is increased, the capacitive coupling between the signal lines affects the read out pixel data of the other vertical scan, which may deteriorate the image quality. That is, a signal level difference may increase between the signal lines cM_vl1 to cM_vl4 and the signal lines cM_vl5 and cM_vl6.

In a photoelectric conversion device in which only a single vertical scan is performed, pixels to be read out at the same time exist at close positions and have close luminance. However, when a plurality of vertical scans is executed at the same time, a state may occur in which pixel positions to be read out are separated and a luminance difference between pixels becomes large. Further, when the number of signal lines arranged in the same pixel column is increased in order to increase the readout speed of pixel data, the influence of capacitive coupling between the signal lines becomes more significant by arranging the signal lines at a narrow pitch.

In the present embodiment, the start times of the readout scan by the first vertical scan are the time T1, the time T2, and the time T3, and the start times of the readout scan by the second vertical scan are the time T1b1, the time T1b4, the time T2b1, and the time T2b4, but the respective vertical scans may be started at arbitrary times. In this case, in accordance with the start time of each vertical scan, the row positions of the pixels P to be readout by the respective vertical scans may also be different in a period in which the readout operations overlap.

Next, the inter-vertical signal line coupling correction unit of the signal processing unit 50 will be described with reference to FIG. 7. As described above, the signal processing unit 50 includes the inter-vertical signal line coupling correction unit 52 as at least a part of the digital signal processing unit. As illustrated in FIG. 7, the inter-vertical signal line coupling correction unit 52 includes pixel data acquisition units 54, difference acquisition units 56, comparison units 58, a threshold value setting unit 60, correction units 62, and a correction value setting unit 64.

The inter-vertical signal line coupling correction unit 52 includes k-number of pixel data acquisition units 54, (k−1)-number of difference acquisition units 56, (k−1)-number of comparison units 58, and k-number of correction units 62 corresponding to the number (k) of signal lines cM_vlK included in the vertical output lines 14 of each column. The k-number of pixel data acquisition units 54 and the k-number of correction units 62 are provided corresponding to each of the k-number of signal lines cM_vlK. The (k−1)-number of difference acquisition units 56 and the (k−1)-number of comparison units 58 are provided corresponding to each pair of two adjacent signal lines cM_vlK.

Each of the pixel data acquisition units 54 is configured to receive the pixel data output from the corresponding signal line cM_vlK. Each of the difference acquisition units 56 is connected to two pixel data acquisition units 54 to which pixel data is input from the two corresponding signal lines cM_vlK. Each of the comparison units 58 is connected to the difference acquisition unit 56 corresponding to the same two signal lines cM_vlK and the threshold value setting unit 60. Each of the correction units 62 is connected to the pixel data acquisition unit 54 to which pixel data is input from the corresponding signal line cM_vlK, the difference acquisition unit 56 and the comparison unit 58 each corresponding to the corresponding signal line cM_vlK. Each of the correction units 62 is connected to the correction value setting unit 64.

The inter-vertical signal line coupling correction unit 52 acquires pixel data readout from the k-number (six in the present embodiment) of signal lines cM_vlK arranged in the same pixel column in parallel from the memory of the column circuit unit 30 via the horizontal transfer unit 40, and performs prescribed processing.

The pixel data acquisition unit 54 acquires the pixel data converted into a digital signal from the memory of the column circuit unit 30 via the horizontal transfer unit 40.

The difference acquisition unit 56 calculates a difference value of the pixel data acquired by the two pixel data acquisition units 54 corresponding to the adjacent signal lines cM_vlK and cM_vl(K+1), and outputs the calculated difference value.

The comparison unit 58 compares the difference value calculated by the difference acquisition unit 56 with a threshold value set in the threshold value setting unit 60, and outputs the comparison result to the correction unit 62.

The correction unit 62 determines whether or not to correct the pixel data based on the comparison result of the comparison unit 58. When it is determined that the correction of the pixel data is to be performed, the correction unit 62 outputs the difference value calculated by the difference acquisition unit 56 to the correction value setting unit 64. Further, the correction unit 62 corrects the pixel data based on the correction value acquired from the correction value setting unit 64, and outputs the corrected image data from the inter-vertical signal line coupling correction unit 52 to the circuit unit in the subsequent stage.

The correction value setting unit 64 calculates a correction value based on the preset information and the input difference value, and outputs the calculated correction value to the correction unit 62.

The threshold value setting unit 60 and the correction value setting unit 64 may be configured by a volatile storage medium such as a flip-flop or an SRAM, and may update the value after power-on. Alternatively, the threshold value setting unit 60 and the correction value setting unit 64 may be configured by a non-volatile storage medium such as a ROM, and may store a fixed value in advance.

Next, a specific processing procedure in the inter-vertical signal line coupling correction unit 52 will be described with reference to FIG. 8.

First, the pixel data acquisition unit 54 acquires k-number of pixel data held in the memory of the M-th column of the column circuit unit 30 (Step S101). Here, the pixel data output via the signal line cM_vlK is referred to as a pixel data K, and the pixel data output via the signal line cM_vl (K+1) is referred to as a pixel data K+1. Here, K is an integer of 1 to (k−1).

Next, the difference acquisition unit 56 obtains the difference value of the pixel data K and K+1 output via the adjacent signal lines cM_vlK and cM_vl(K+1) (Step S102).

Next, the comparison unit 58 compares the difference value acquired by the difference acquisition unit 56 with a threshold value set in advance in the threshold value setting unit 60, and determines whether or not the difference value exceeds the threshold value (Step S103). As a result of the determination, when the difference value does not exceed the threshold value (No), the pixel data is not corrected, and the processing ends. When it is determined that the difference value exceeds the threshold value (Yes), the process proceeds to Step S104.

Next, the comparison unit 58 compares the signal level of the pixel data K with the signal level of the pixel data K+1, and determines whether or not the signal level of the pixel data K is lower than the signal level of the pixel data K+1 (Step S104). As a result of the determination, when the signal level of the pixel data K is lower than the signal level of the pixel data K+1 (Yes), the process proceeds to Step S105, and when the signal level of the pixel data K is equal to or higher than the signal level of the pixel data K+1 (No), the process proceeds to Step S107.

In Step S105, the correction value setting unit 64 calculates a correction value for the pixel data K. In Step S106, the pixel data K is corrected according to the calculated correction value.

In Step S107, the correction value setting unit 64 calculates a correction value for the pixel data K+1. In Step S108, the pixel data K+1 is corrected according to the calculated correction value.

The inter-vertical signal line coupling correction unit 52 performs the processing of the Step S102 to the Step S108 in the above flow in parallel with respect to the k-number of pixel data read out from the k-number of signal lines cM_vlK arranged in the same pixel column.

The calculation of the correction value in the correction value setting unit 64 is not particularly limited, but may be performed, for example, by the following method.

As a first method, there is a method in which coefficients of a linear function indicating a relationship between an influence caused by coupling between the signal lines cM_vlK and a difference value between the pixel data are stored in the correction value setting unit 64 as a parameter for calculating a correction value. For example, as illustrated in FIG. 9, the correction value may be expressed as "correction value=a×difference value+b", where a is the slope of the linear function and b is the intercept. Therefore, by storing the coefficients a and b of the linear function indicating the relationship between the influence of the coupling between the signal lines cM_vlK and the difference value between the pixel data in the correction value setting unit 64, the correction value may be calculated based on the difference value calculated by the comparison unit 58. The correction unit 62 may correct the pixel data by subtracting the correction value acquired from the correction value setting unit 64 from the pixel data.

As a second method, there is a method in which a lookup table indicating a relationship between an influence caused by coupling between the signal lines cM_vlK and a difference value between the pixel data is stored in the correction value setting unit 64 as a parameter for calculating a correction value. In the lookup table, for example, as illustrated in FIG. 10, the influence of the coupling between the signal lines cM_vlK, i.e., a minimum value and a maximum value of the difference value between the pixel data with respect to a correction value. For example, a minimum value and a maximum value of the difference value for the correction value of 1 LSB are set as "min1" and "max1", respectively, and similarly, a minimum value and a maximum value of the difference value for the correction value of 2 LSB are set as "min2" and "max2", respectively. Similarly, minimum values and maximum values are set up to a necessary correction value n. The correction value setting unit 64 refers to the difference value notified from the correction unit 62 and the lookup table, searches for a correction value including the difference value between the minimum value and the maximum value, and outputs the corresponding correction value to the correction unit 62. The correction unit 62 may correct the pixel data by subtracting the correction value acquired from the correction value setting unit 64 from the pixel data.

As described above, in the present embodiment, the correction value is calculated in accordance with the difference value of the signal level between the pixel data passing through the vertical signal lines arranged in the same pixel column, and the pixel data is corrected. Therefore, according to the present embodiment, it is possible to reduce the influence of coupling between the vertical signal lines and acquire a high-quality image.

Second Embodiment

Figure 11:
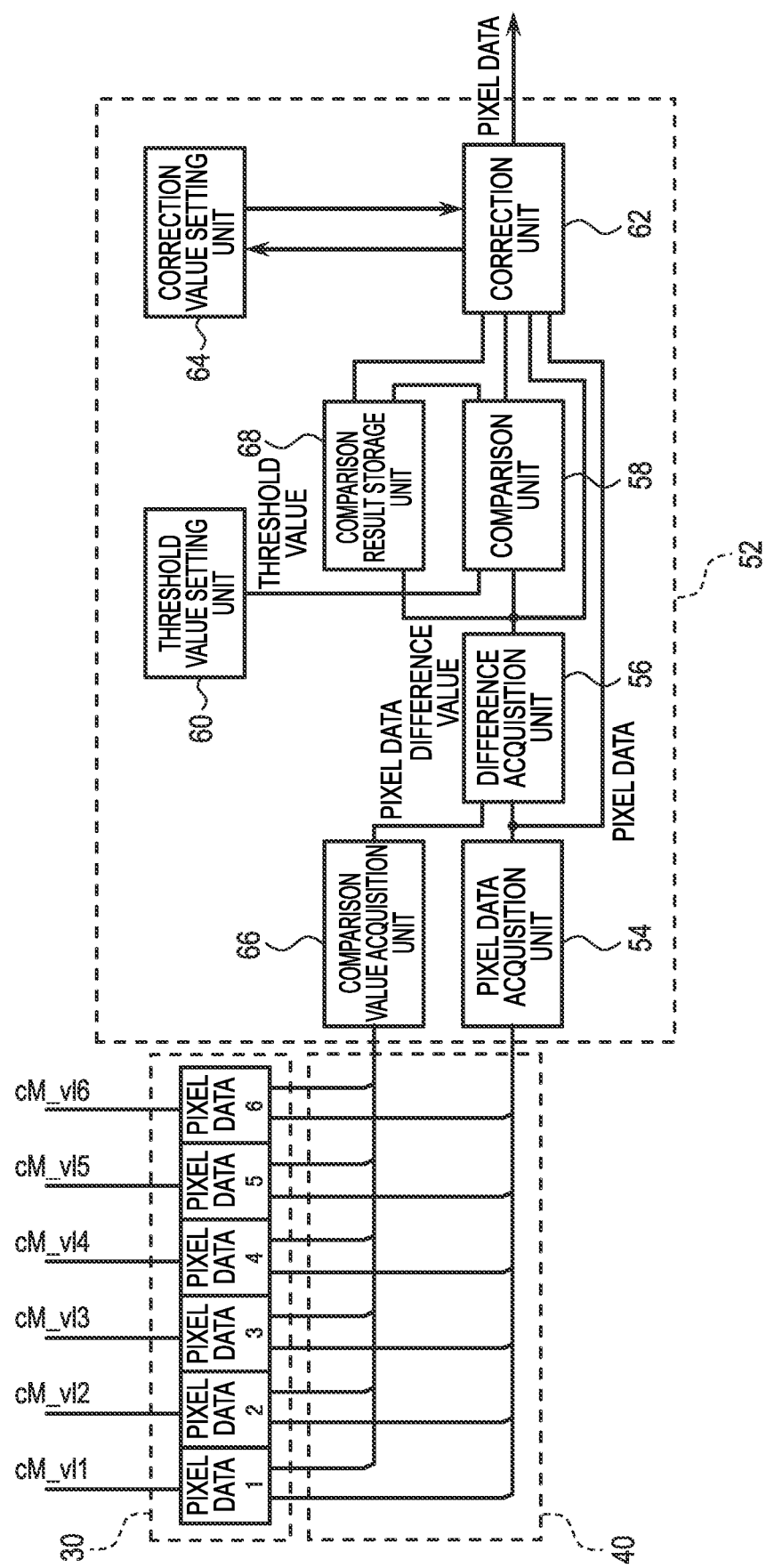
FIG. 11 is a block diagram illustrating a configuration example of an inter-vertical signal line coupling correction unit in a photoelectric conversion device according to a second embodiment of the present invention.
Figure 12:
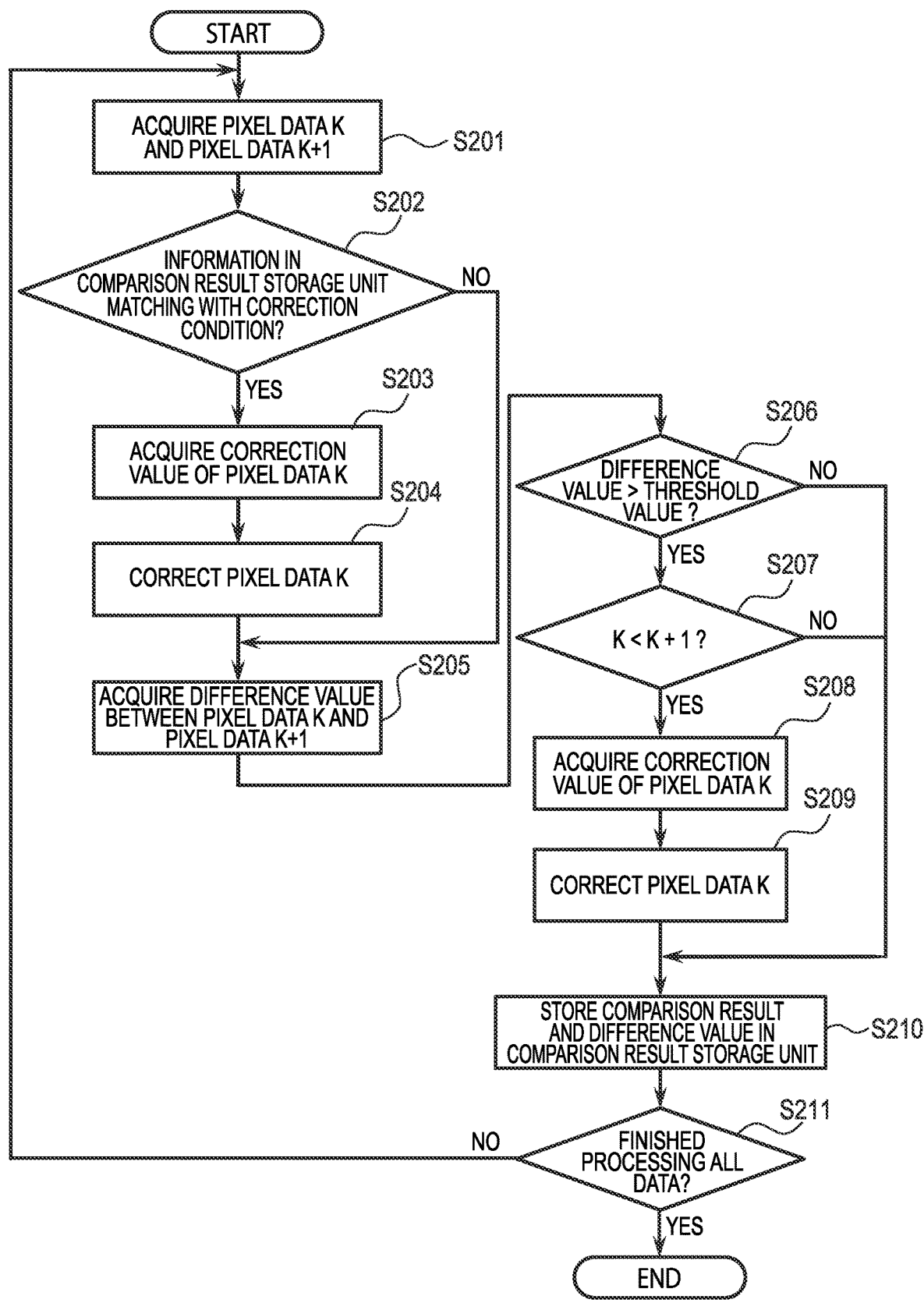
FIG. 12 is a flowchart illustrating an operation example of the inter-vertical signal line coupling correction unit in the photoelectric conversion device according to the second embodiment of the present invention.

A photoelectric conversion device according to a second embodiment of the present invention will be described with reference to FIG. 11 and FIG. 12. FIG. 11 is a block diagram illustrating a configuration example of an inter-vertical signal line coupling correction unit in the photoelectric conversion device according to the present embodiment. FIG. 12 is a flowchart illustrating an operation example of the inter-vertical signal line coupling correction unit in the photoelectric conversion device according to the present embodiment. Components similar to those of the photoelectric conversion device according to the first embodiment are denoted by the same reference numerals, and description thereof will be omitted or simplified.

The photoelectric conversion device according to the present embodiment is the same as the photoelectric conversion device according to the first embodiment except that the configuration of the inter-vertical signal line coupling correction unit is different. As illustrated in FIG. 11, the inter-vertical signal line coupling correction unit 52 of the present embodiment includes a pixel data acquisition unit 54, a difference acquisition unit 56, a comparison unit 58, a threshold value setting unit 60, a correction unit 62, a correction value setting unit 64, a comparison value acquisition unit 66, and a comparison result storage unit 68.

The pixel data acquisition unit 54 and the comparison value acquisition unit 66 are connected to the horizontal transfer unit 40. The difference acquisition unit 56 is connected to the pixel data acquisition unit 54 and the comparison value acquisition unit 66. The comparison unit 58 is connected to the difference acquisition unit 56 and the threshold value setting unit 60. The comparison result storage unit 68 is connected to the difference acquisition unit 56 and the comparison unit 58. The correction unit 62 is connected to the pixel data acquisition unit 54, the difference acquisition unit 56, the comparison unit 58, the comparison result storage unit 68, and the correction value setting unit 64.

The inter-vertical signal line coupling correction unit 52 sequentially acquires pixel data read out from the k-number (six in the present embodiment) of signal lines cM_vlK arranged in the same pixel column from the memory of the column circuit unit 30 one by one via the horizontal transfer unit 40, and performs processing.

The pixel data acquisition unit 54 acquires the pixel data converted into a digital signal from the memory of the column circuit unit 30. The pixel data may be acquired in ascending order from the pixel data of the signal line cM_vl1 to the pixel data of the signal line cM_vl6, or may be acquired in descending order from the pixel data of the signal line cM_vl6 to the pixel data of the signal line cM_vl1.

The comparison value acquisition unit 66 acquires the pixel data of the signal line cM_vl(K+1) or the signal line cM_vl(K−1) adjacent to the signal line cM_vlK from which the pixel data acquired by the pixel data acquisition unit 54 is output. For example, when the pixel data acquisition unit 54 starts acquisition in ascending order from the pixel data of the signal line cM_vl1, the comparison value acquisition unit 66 acquires the pixel data of the signal line cM_vl2. Next, when the pixel data acquisition unit 54 acquires the pixel data of the signal line cM_vl2, the comparison value acquisition unit 66 acquires the pixel data of the signal line cM_vl3. Similarly, the comparison value acquisition unit 66 sequentially acquires pixel data up to the pixel data of the signal line cM_vl6.

The difference acquisition unit 56 calculates a difference value between the pixel data acquired by the pixel data acquisition unit 54 and the pixel data acquired by the comparison value acquisition unit 66, and outputs the calculated difference value to the comparison unit 58, the correction unit 62, and the comparison result storage unit 68.

The comparison unit 58 compares the difference value calculated by the difference acquisition unit 56 with a threshold value set in the threshold value setting unit 60, and outputs the comparison result to the correction unit 62. The comparison result storage unit 68 stores the difference value calculated by the difference acquisition unit 56 and the comparison result performed by the comparison unit 58.

The correction unit 62 determines whether or not to correct the pixel data based on the comparison result of the comparison unit 58 or the comparison result stored in the comparison result storage unit 68. When determining that the correction of the pixel data is to be performed, the correction unit 62 outputs the difference value calculated by the difference acquisition unit 56 or the difference value stored in the comparison result storage unit 68 to the correction value setting unit 64. Further, the correction unit 62 corrects the pixel data based on the correction value acquired from the correction value setting unit 64, and outputs the corrected image data from the inter-vertical signal line coupling correction unit 52 to the circuit unit in the subsequent stage.

The correction value setting unit 64 calculates a correction value based on the preset information and the input difference value, and outputs the calculated correction value to the correction unit 62.

The threshold value setting unit 60 and the correction value setting unit 64 may be configured by a volatile storage medium such as a flip-flop or an SRAM, and may update the value after power-on. Alternatively, the threshold value setting unit 60 and the correction value setting unit 64 may be configured by a non-volatile storage medium such as a ROM, and may store a fixed value in advance.

Next, a specific processing procedure in the inter-vertical signal line coupling correction unit 52 will be described with reference to FIG. 12. Here, it is assumed that the pixel data acquisition unit 54 acquires pixel data of the signal line cM_vl1 to pixel data of the signal line cM_vl6 in ascending order.

First, the pixel data acquisition unit 54 acquires the pixel data corresponding to the signal line cM_vlK among the k-number of pixel data held in the memory of the M-th column of the column circuit unit 30. Further, the comparison value acquisition unit 66 acquires the pixel data corresponding to the signal line CM_vl(K+1) among the k-number of pixel data held in the memory of the M-th column of the column circuit unit 30 (Step S201). Here, the pixel data output via the signal line cM_vlK is referred to as a pixel data K, and the pixel data output via the signal line cM_vl(K+1) is referred to as a pixel data K+1. Here, K is an integer of 1 to (k−1). For example, the pixel data acquired by the pixel data acquisition unit 54 is the pixel data of the signal line cM_vl1, and the pixel data acquired by the comparison value acquisition unit 66 is the pixel data of the signal line cM_vl2.

Next, referring to the information stored in the comparison result storage unit 68, it is determined whether or not the information corresponds to the correction condition of the pixel data (Step S202). The comparison result storage unit 68 stores a comparison result of the previous data, that is, a comparison result of the pixel data of the signal line cM_vl(K−1) and the pixel data of the signal line cM_vlK. Specifically, the comparison result storage unit 68 stores whether or not the difference value between the pixel data K−1 and the pixel data K exceeds a threshold value and whether or not the pixel data K is equal to or greater than the pixel data K−1. When the difference value between the pixel data K−1 and the pixel data K exceeds the threshold value and the pixel data K is larger than the pixel data K−1, the correction condition is satisfied. When the pixel data K−1 and the pixel data K do not satisfy this relationship, the correction condition is not satisfied.

As a result of the determination in Step S202, when the information stored in the comparison result storage unit 68 does not correspond to the correction condition (No), the process proceeds to Step S205. When the information stored in the comparison result storage unit 68 corresponds to the correction condition (Yes), the process proceeds to Step S203. In Step S203, the correction value setting unit 64 calculates a correction value for the pixel data K. In Step S204, the pixel data K is corrected according to the calculated correction value. Since information is written in the comparison result storage unit 68 in Step S210 described later, information indicating that the correction condition is not satisfied is stored as an initial value in the comparison result storage unit 68 when the first pixel data is determined.

Next, the difference acquisition unit 56 obtains a difference value between the pixel data K and the pixel data K+1 obtained in Step S201 (Step S205).

Next, the comparison unit 58 compares the difference value acquired by the difference acquisition unit 56 with a threshold value set in advance in the threshold value setting unit 60, and determines whether or not the difference value exceeds the threshold value (Step S206). As a result of the determination, when the difference value does not exceed the threshold value (No), the pixel data K is not corrected, and the process proceeds to Step S210. When it is determined that the difference value exceeds the threshold value (Yes), the process proceeds to Step S207.

In Step S207, the comparison unit 58 compares the signal level of the pixel data K with the signal level of the pixel data K+1, and determines whether or not the signal level of the pixel data K is lower than the signal level of the pixel data K+1. As a result of the determination, when the signal level of the pixel data K is equal to or higher than the signal level of the pixel data K+1 (No), the process proceeds to Step S210. When it is determined that the signal level of the pixel data K is lower than the signal level of the pixel data K+1 (Yes), the process proceeds to Step S208.

In Step S208, the correction value setting unit 64 calculates a correction value for the pixel data K. In Step S209, the correction unit 62 corrects the pixel data K according to the calculated correction value.

In Step S210, the difference value acquired in Step S205 and the comparison results acquired in Step S206 and Step S207 are stored in the comparison result storage unit 68.

Next, it is determined whether or not processing of all the pixel data output via the signal lines cM_vl1 to cM_vl6 included in the vertical output line 14 of one column is completed (Step S211). As a result of the determination, when the processing of all the pixel data is finished (Yes), the series of processing in the inter-vertical signal line coupling correction unit 52 is terminated. As a result of the determination, when all the pixel data are not processed (No), the process returns to Step S201, and the process proceeds to the next pixel data processing.

In the above driving example, although the pixel data acquisition unit 54 acquires the pixel data of the signal line cM_vl1 from the pixel data of the signal line cM_vl6 in ascending order, the pixel data acquisition unit 54 may acquire the pixel data of the signal line cM_vl1 from the pixel data of the signal line cM_vl6 in descending order. In this case, the processing of each step may be appropriately changed so as to match the processing order of the pixel data.

According to the above configuration of the present embodiment, even when the signal processing unit 50 sequentially processes a plurality of pixel data output via a plurality of signal lines arranged in the same pixel column, it is possible to correct the pixel data by obtaining comparison values at the same time and obtaining the difference values.

Third Embodiment

Figure 13:
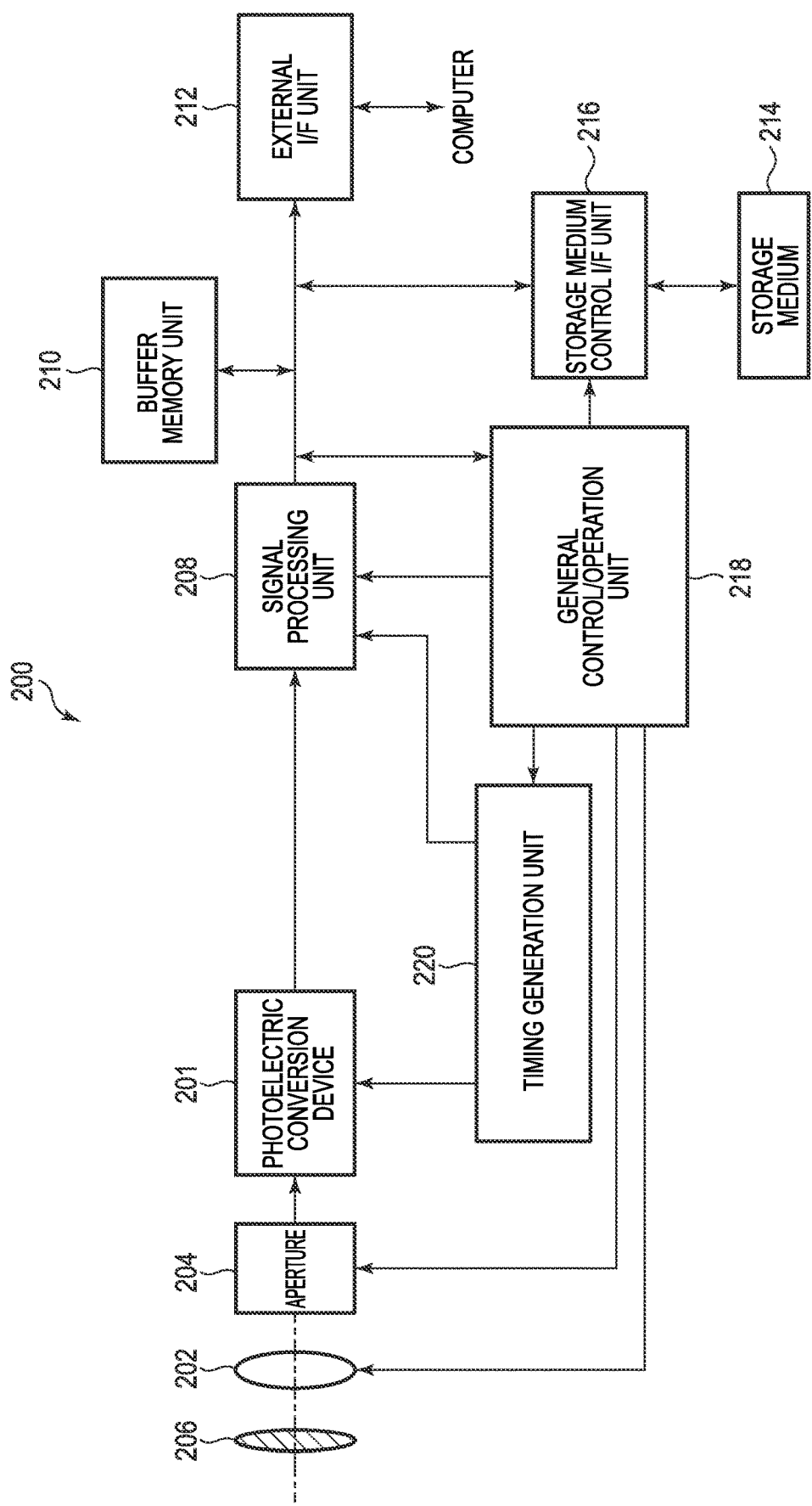
FIG. 13 is a block diagram illustrating a schematic configuration of an imaging system according to a third embodiment of the present invention.

An imaging system according to a third embodiment of the present invention will be described with reference to FIG. 13. FIG. 13 is a block diagram illustrating a schematic configuration of the imaging system according to the present embodiment.

The photoelectric conversion device 100 described in the first and second embodiments may be applied to various imaging systems. Examples of applicable imaging systems include digital still cameras, digital camcorders, surveillance cameras, copying machines, facsimiles, mobile phones, on-vehicle cameras, observation satellites, and the like. A camera module including an optical system such as a lens and an imaging device is also included in the imaging system. FIG. 13 is a block diagram of a digital still camera as an example of these.

The imaging system 200 illustrated in FIG. 13 includes an imaging device 201, a lens 202 for forming an optical image of an object on the imaging device 201, an aperture 204 for varying the amount of light passing through the lens 202, and a barrier 206 for protecting the lens 202. The lens 202 and the aperture 204 form an optical system that collect light on the imaging device 201. The imaging device 201 is the photoelectric conversion device 100 described in the first or second embodiment, and converts an optical image formed by the lens 202 into image data.

The imaging system 200 also includes a signal processing unit 208 that processes an output signal output from the imaging device 201. The signal processing unit 208 generates image data from a digital signal output from the imaging device 201. The signal processing unit 208 performs various corrections and compressions as necessary and outputs the processed image data. The imaging device 201 may include an AD conversion unit that generates a digital signal to be processed by the signal processing unit 208. The AD conversion unit may be formed on a semiconductor layer (semiconductor substrate) in which the photoelectric conversion unit of the imaging device 201 is formed, or may be formed in a semiconductor layer different from the semiconductor layer on which the photoelectric conversion unit of the imaging device 201 is formed. The signal processing unit 208 may be formed on the same semiconductor layer as the imaging device 201.

The imaging system 200 further includes a buffer memory unit 210 for temporarily storing image data, and an external interface unit (external I/F unit) 212 for communicating with an external computer or the like. Further, the imaging system 200 includes a storage medium 214 such as a semiconductor memory for storing or reading out the imaging data, and a storage medium control interface unit (storage medium control I/F unit) 216 for storing or reading out the imaging data on or from the storage medium 214. The storage medium 214 may be built in the imaging system 200, or may be detachable.

The imaging system 200 further includes a general control/operation unit 218 that controls various calculations and operations of the entire digital still camera, and a timing generation unit 220 that outputs various timing signals to the imaging device 201 and the signal processing unit 208. Here, the timing signal or the like may be input from the outside, and the imaging system 200 may include at least the imaging device 201 and the signal processing unit 208 that processes an output signal output from the imaging device 201.

The imaging device 201 outputs the imaging signal to the signal processing unit 208. The signal processing unit 208 performs predetermined signal processing on the imaging signal output from the imaging device 201, and outputs image data. The signal processing unit 208 generates an image using the imaging signal.

As described above, according to the present embodiment, it is possible to realize an imaging system to which the photoelectric conversion device 100 according to the first or second embodiment is applied.

Fourth Embodiment

Figure 14A:
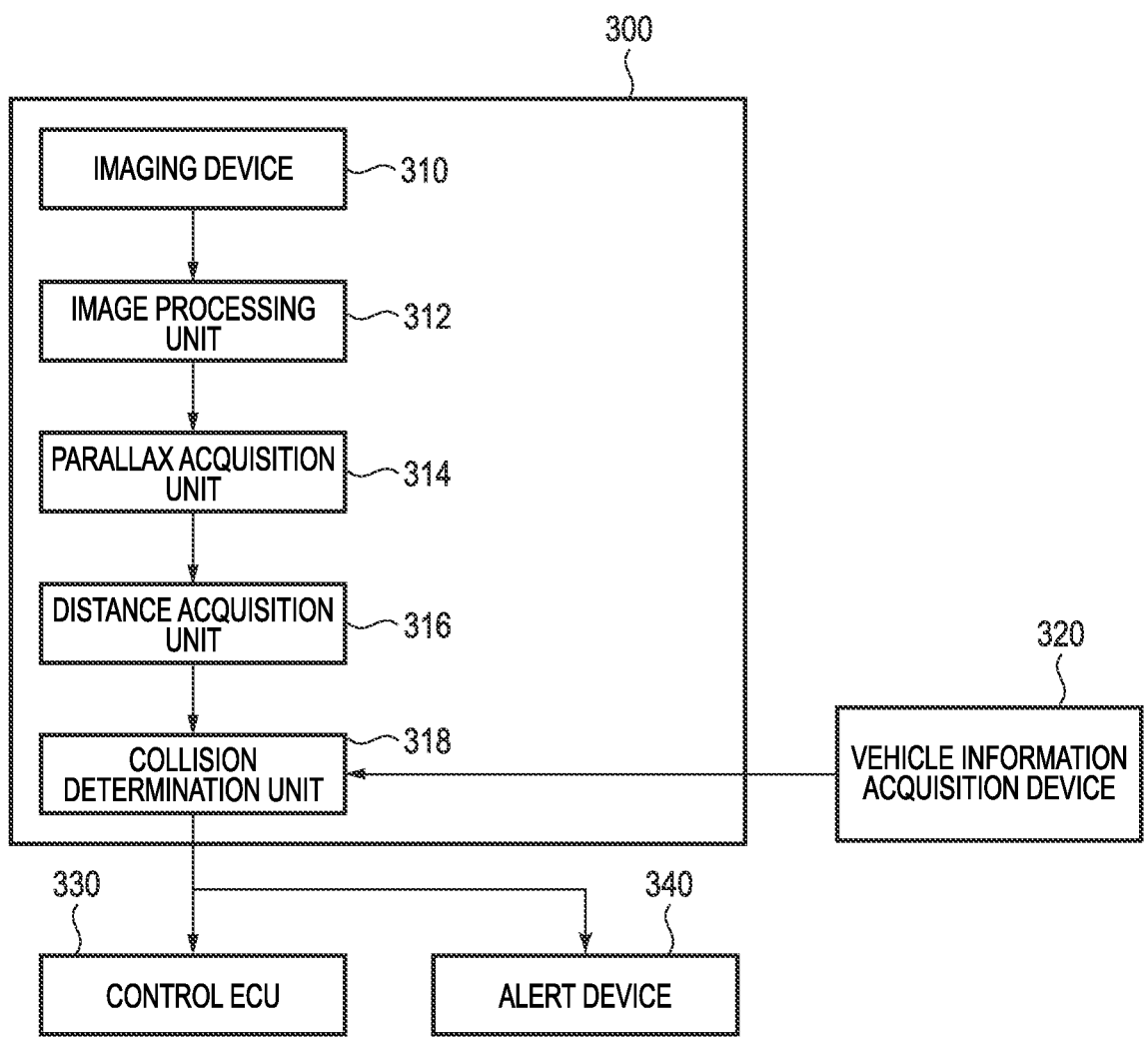
FIG. 14A is a diagram illustrating a configuration example of an imaging system according to a fourth embodiment of the present invention.
Figure 14B:
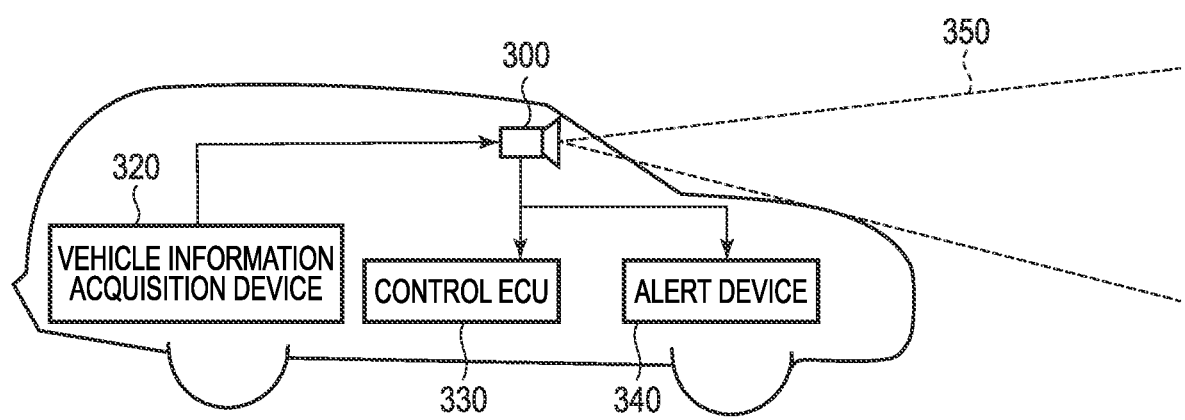
FIG. 14B is a diagram illustrating a configuration example of a movable object according to the fourth embodiment of the present invention.

An imaging system and a movable object according to a fourth embodiment of the present invention will be described with reference to FIG. 14A and FIG. 14B. FIG. 14A is a diagram illustrating a configuration of the imaging system according to the present embodiment. FIG. 14B is a diagram illustrating a configuration of a movable object according to the present embodiment.

FIG. 14A illustrates an example of an imaging system relating to an on-vehicle camera. The imaging system 300 includes an imaging device 310. The imaging device 310 is the photoelectric conversion device 100 described in the first or second embodiment. The imaging system 300 includes an image processing unit 312 that performs image processing on a plurality of image data acquired by the imaging device 310, and a parallax acquisition unit 314 that calculates parallax (phase difference of parallax images) from the plurality of image data acquired by the imaging system 300. The imaging system 300 includes a distance acquisition unit 316 that calculates a distance to an object based on the calculated parallax, and a collision determination unit 318 that determines whether or not there is a possibility of collision based on the calculated distance. Here, the parallax acquisition unit 314 and the distance acquisition unit 316 are examples of a distance information acquisition unit that acquires distance information to the object. That is, the distance information may be information on a parallax, a defocus amount, a distance to the object, and the like. The collision determination unit 318 may determine the collision possibility using any of these pieces of distance information. The distance information acquisition unit may be implemented by dedicated hardware or software modules. Further, it may be implemented by FPGA (Field Programmable Gate Array), ASIC (Application Specific Integrated circuit), or the like, or may be implemented by a combination of these.

The imaging system 300 is connected to a vehicle information acquisition device 320, and may acquire vehicle information such as a vehicle speed, a yaw rate, and a steering angle. Further, the imaging system 300 is connected to a control ECU 330 which is a control device that outputs a control signal for generating a braking force to the vehicle based on the determination result of the collision determination unit 318. The imaging system 300 is also connected to an alert device 340 that issues an alert to the driver based on the determination result of the collision determination unit 318. For example, when the collision possibility is high as the determination result of the collision determination unit 318, the control ECU 330 performs vehicle control to avoid collision and reduce damage by braking, returning an accelerator, suppressing engine output, or the like. The alert device 340 alerts a user by sounding an alarm such as a sound, displaying alert information on a screen of a car navigation system or the like, or giving vibration to a seat belt or a steering wheel.

In the present embodiment, the imaging system 300 images the periphery of the vehicle, for example, the front or the rear. FIG. 14B illustrates an imaging system in the case of imaging an image in front of a vehicle (an imaging range 350). The vehicle information acquisition device 320 sends an instruction to the imaging system 300 or the imaging device 310. With such a configuration, the accuracy of distance measurement may be further improved.

In the above description, an example has been described in which control is performed so as not to collide with other vehicles, but the present invention is also applicable to control of automatic driving following other vehicles, control of automatic driving so as not to go out of a lane, and the like. Further, the imaging system is not limited to a vehicle such as a host vehicle, and may be applied to, for example, a movable object (moving device) such as a ship, an aircraft, or an industrial robot. In addition, the present invention may be applied not only to a movable object but also to a wide variety of equipment such as ITS (Intelligent Transport Systems).

Fifth Embodiment

Figure 15:
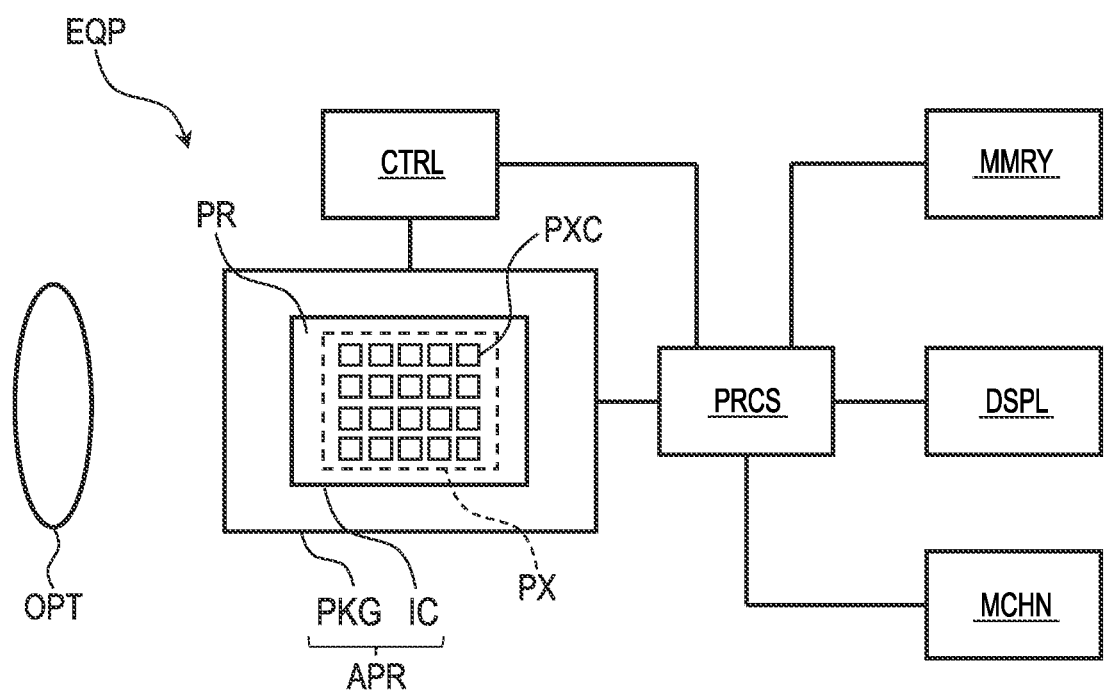
FIG. 15 is a block diagram illustrating a schematic configuration of equipment according to a fifth embodiment of the present invention.

Equipment according to a fifth embodiment of the present invention will be described with reference to FIG. 15. FIG. 15 is a block diagram illustrating a schematic configuration of equipment according to the present embodiment.

FIG. 15 is a schematic diagram illustrating equipment EQP including the photoelectric conversion device APR. The photoelectric conversion device APR has the function of the photoelectric conversion device 100 according to the first or second embodiment. All or a part of the photoelectric conversion device APR is a semiconductor device IC. The photoelectric conversion device APR of this example may be used, for example, as an image sensor, an AF (Auto Focus) sensor, a photometry sensor, or a distance measurement sensor. The semiconductor device IC includes a pixel area PX in which pixel circuits PXC including photoelectric conversion units are arranged in a matrix. The semiconductor device IC may include a peripheral area PR around the pixel area PX. Circuits other than the pixel circuits may be arranged in the peripheral area PR.

The photoelectric conversion device APR may have a structure (chip stacked structure) in which a first semiconductor chip provided with a plurality of photoelectric conversion units and a second semiconductor chip provided with peripheral circuits are stacked. Each peripheral circuit in the second semiconductor chip may be a column circuit corresponding to a pixel column of the first semiconductor chip. The peripheral circuits in the second semiconductor chip may be matrix circuits corresponding to the pixels or the pixel blocks of the first semiconductor chip. As a connection between the first semiconductor chip and the second semiconductor chip, a through electrode (TSV (Through Silicon Via)), an inter-chip interconnection by direct bonding of a conductor such as copper, a connection by micro bumps between chips, a connection by wire bonding, or the like may be adopted.

In addition to the semiconductor device IC, the photoelectric conversion device APR may include a package PKG that accommodates the semiconductor device IC. The package PKG may include a base body to which the semiconductor device IC is fixed, a lid body made of glass or the like facing the semiconductor device IC, and a connection member such as a bonding wire or a bump that connects a terminal provided on the base body to a terminal provided on the semiconductor device IC.

The equipment EQP may further comprise at least one of an optical device OPT, a control device CTRL, a processing device PRCS, a display device DSPL, a storage device MMRY, and a mechanical device MCHN. The optical device OPT corresponds to the photoelectric conversion device APR as a photoelectric conversion device, and is, for example, a lens, a shutter, or a mirror. The control device CTRL controls the photoelectric conversion device APR, and is, for example, a semiconductor device such as an ASIC. The processing device PRCS processes a signal output from the photoelectric conversion device APR, and constitutes an AFE (analog front end) or a DFE (digital front end). The processing unit PRCS is a semiconductor device such as a CPU (central processing unit) or an ASIC. The display device DSPL may be an EL (electroluminescent) display device or a liquid crystal display device which displays information (image) obtained by the photoelectric conversion device APR. The storage device MMRY may be a magnetic device or a semiconductor device that stores information (image) obtained by the photoelectric conversion device APR. The storage device MMRY may be a volatile memory such as an SRAM or a DRAM, or a nonvolatile memory such as a flash memory or a hard disk drive. The mechanical device MCHN includes a movable portion or a propulsion portion such as a motor or an engine.

In the equipment EQP, a signal output from the photoelectric conversion device APR may be displayed on the display device DSPL, and is transmitted to the outside by a communication device (not illustrated) included in the equipment EQP. Therefore, it is preferable that the equipment EQP further include a storage device MMRY and a processing device PRCS separately from the storage circuit unit and the arithmetic circuit unit included in the photoelectric conversion device APR.

The equipment EQP illustrated in FIG. 15 may be an electronic device such as an information terminal (for example, a smartphone or a wearable terminal) having a photographing function or a camera (for example, an interchangeable lens camera, a compact camera, a video camera, and a surveillance camera). The mechanical device MCHN in the camera may drive components of the optical device OPT for zooming, focusing, and shutter operation. The equipment EQP may be a transportation device (movable object) such as a vehicle, a ship, or an airplane. The equipment EQP may be a medical device such as an endoscope or a CT scanner.

The mechanical device MCHN in the transport device may be used as a mobile device. The equipment EQP as a transport device is suitable for transporting the photoelectric conversion device APR, or for assisting and/or automating operation (manipulation) by an imaging function. The processing device PRCS for assisting and/or automating operation (manipulation) may perform processing for operating the mechanical device MCHN as a mobile device based on information obtained by the photoelectric conversion device APR.

The photoelectric conversion device APR according to the present embodiment may provide the designer, the manufacturer, the seller, the purchaser, and/or the user with high value. Therefore, when the photoelectric conversion device APR is mounted on the equipment EQP, the value of the equipment EQP may be increased. Therefore, in order to increase the value of the equipment EQP, it is advantageous to determine the mounting of the photoelectric conversion device APR of the present embodiment on the equipment EQP when the equipment EQP is manufactured and sold.

Modified Embodiments

The present invention is not limited to the above-described embodiments, and various modifications are possible.

For example, an example in which some of the configurations of any of the embodiments are added to other embodiments or an example in which some of the configurations of any of the embodiments are substituted with some of the configurations of the other embodiments is also an embodiment of the present invention.

Further, in the above-described embodiments, the correction processing is performed between the pixel data output via the signal line cM_vlK and the pixel data output via the signal line cM_vl(K+1) adjacent to the signal line cM_vlK, but the combination of the pixel data is not limited thereto. The comparison data with respect to the pixel data to be corrected need not necessarily be the pixel data output via the adjacent signal line, but may be the pixel data output via a signal line adjacent with one or more adjacent signal lines interposed therebetween. The comparison data for the pixel data to be corrected is not necessarily one pixel data, and may be two or more pixel data. In these cases, the inter-vertical signal line coupling correction unit 52 may be appropriately modified so as to process also the difference value between the pixel data output via a signal line adjacent with one or more adjacent signal lines interposed therebetween.

Although the photoelectric conversion device 100 including the signal processing unit 50 including the inter-vertical signal line coupling correction unit 52 is described in the above embodiments, the signal processing unit 50 need not necessarily be provided in the photoelectric conversion device 100. For example, a device different from the photoelectric conversion device 100 may include a functional block having a function of the signal processing unit 50 (or a function of the inter-vertical signal line coupling correction unit 52). Alternatively, a signal processing device different from the photoelectric conversion device 100 may have a function of the signal processing unit 50 (or a function of the inter-vertical signal line coupling correction unit 52). In these cases, the signal processing device may be a computer such as a personal computer including a processor (e.g., CPU or MPU (micro processing unit)). The signal processing unit 50 (the inter-vertical signal line coupling correction unit 52) may be a circuit such as an ASIC.

Further, in the third to fifth embodiments, as the photoelectric conversion device, a device intended to acquire an image, i.e., an imaging device is exemplified, but the application example of the present invention is not necessarily limited to the imaging device. For example, when the distance measurement as described in the fourth embodiment is applied to a main target device, it is not always necessary to output an image. In such a case, the device may be referred to as a photoelectric conversion device that converts optical information into a predetermined electric signal. The imaging device is one of photoelectric conversion devices.

The imaging systems described in the third and fourth embodiments are examples of imaging systems to which the photoelectric conversion device of the present invention may be applied, and imaging systems to which the photoelectric conversion device of the present invention may be applied are not limited to the configurations illustrated in FIG. 13 and FIG. 14A.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-204906, filed Dec. 17, 2021 which is hereby incorporated by reference herein in its entirety.

What is claimed is:

1. A photoelectric conversion device comprising:
    a pixel unit including a plurality of pixels each including a photoelectric conversion unit, the plurality of pixels being arranged to form a plurality of rows and a plurality of columns;
    a plurality of signal lines arranged at least two on each of the plurality of columns and each connected to a pixel of a corresponding column;
    a pixel control unit configured to control a readout of signals from the plurality of pixels to the plurality of signal lines in row basis;
    a column circuit unit configured to generate a pixel data that is a digital signal obtained by performing an AD conversion on an analog signal read out from the pixel unit to each of the plurality of signal lines; and
    a signal processing unit configured to perform a digital signal processing on the pixel data output from the column circuit unit,
    wherein the plurality of signal lines includes a first signal line and a second signal line arranged on the same column, and a period during which a readout from a pixel of one row to the first signal line is performed and a period during which a readout from a pixel of the other row to the second signal line is performed overlap each other, and
    wherein the signal processing unit includes:
        a difference acquisition unit configured to acquire a difference value between a pixel data based on a signal read out to the first signal line and a pixel data based on a signal read out to the second signal line; and
        a correction unit configured to perform a correction processing of the pixel data based on the difference value.

2. The photoelectric conversion device according to claim 1,
    wherein the pixel control unit performs a first scan in which signals are sequentially read out in row basis from pixels of a part of the plurality of rows, and a second scan in which signals are sequentially read out in row basis from pixels of another part of the plurality of rows, and
    wherein a period during which a readout from the pixel of the one row to the first signal line in the first scan is performed and a period during which a readout from the pixel of the other row to the second signal line in the second scan is performed overlap each other.

3. The photoelectric conversion device according to claim 1,
    wherein the signal processing unit further includes a comparison unit configured to compare the difference value with a predetermined threshold value, and
    wherein the correction unit is configured to correct the pixel data when the difference value is larger than the threshold value.

4. The photoelectric conversion device according to claim 1, wherein the correction unit is configured to perform a correction on a pixel data having a lower value among the pixel data based on the signal read out to the first signal line and the pixel data based on the signal read out to the second signal line.

5. The photoelectric conversion device according to claim 1, wherein the correction unit is configured to perform a correction for subtracting a correction value obtained from a coefficient of a preset linear function and the difference value, from the pixel data.

6. The photoelectric conversion device according to claim 1, wherein the correction unit is configured to perform a correction for subtracting a correction value obtained by searching a range corresponding to the difference value from a preset table indicating a relationship between a range of a difference value and a corresponding correction value, from the pixel data.

7. The photoelectric conversion device according to claim 1, wherein the difference acquisition unit is configured to acquire a difference value of the pixel data for each of pairs of adjacent signal lines in a plurality of signal lines arranged on the same column.

8. The photoelectric conversion device according to claim 7, wherein the signal processing unit is configured to acquire the pixel data from each of the plurality of signal lines arranged on the same column in an overlapping period, and acquire the difference value for each of the pairs of adjacent signal lines in parallel.

9. The photoelectric conversion device according to claim 7, wherein the signal processing unit is configured to sequentially acquire the pixel data of each of the pairs of adjacent signal lines, and sequentially acquire the difference value for each of the pairs of adjacent signal lines.

10. The photoelectric conversion device according to claim 1, wherein the first signal line and the second signal line are adjacent to each other.

11. The photoelectric conversion device according to claim 1 comprising a first substrate provided with at least the pixel unit and a second substrate stacked on the first substrate and provided with at least the signal processing unit.

12. An imaging system comprising:
    the photoelectric conversion device according to claim 1; and
    a signal processing device configured to process a signal output from the photoelectric conversion device.

13. A movable object comprising:
    the photoelectric conversion device according to claim 1;
    a distance information acquisition unit configured to acquire distance information to an object from a parallax image based on a signal from the photoelectric conversion device; and
    a control unit configured to control the movable object based on the distance information.

14. Equipment comprising:
    the photoelectric conversion device according to claim 1, and
    at least one of
        an optical device corresponding to the photoelectric conversion device,
        a control device configured to control the photoelectric conversion device,
        a processing device configured to process a signal output from the photoelectric conversion device,
        a mechanical device that is controlled based on information obtained by the photoelectric conversion device, a display device configured to display information obtained by the photoelectric conversion device, and a storage device configured to store information obtained by the photoelectric conversion device.

15. A signal processing device configured to perform a signal processing on a signal output from a photoelectric conversion device including a pixel unit including a plurality of pixels each including a photoelectric conversion unit, the plurality of pixels being arranged to form a plurality of rows and a plurality of columns; a plurality of signal lines arranged at least two on each of the plurality of columns and each connected to a pixel of a corresponding column; a pixel control unit configured to control a readout of signals from the plurality of pixels to the plurality of signal lines in row basis; and a column circuit unit configured to generate a pixel data that is a digital signal obtained by performing an AD conversion on an analog signal read out from the pixel unit to each of the plurality of signal lines, wherein the plurality of signal lines includes a first signal line and a second signal line arranged on the same column, and a period during which a readout from a pixel of one row to the first signal line is performed and a period during which a readout from a pixel of the other row to the second signal line is performed overlap each other, the signal processing device comprising:

a difference acquisition unit configured to acquire a difference value between a pixel data based on a signal read out to the first signal line and a pixel data based on a signal read out to the second signal line; and a correction unit configured to perform a correction processing of the pixel data based on the difference value.

16. The signal processing device according to claim 15 further comprising a comparison unit configured to compare the difference value with a predetermined threshold value, and wherein the correction unit is configured to correct the pixel data when the difference value is larger than the threshold value.

17. The signal processing device according to claim 15, wherein the correction unit is configured to perform a correction on a pixel data having a lower value among the pixel data based on the signal read out to the first signal line and the pixel data based on the signal read out to the second signal line.

18. The signal processing device according to claim 15, wherein the difference acquisition unit is configured to acquire a difference value of the pixel data for each of pairs of adjacent signal lines in a plurality of signal lines arranged on the same column.

* * * * *